(12) United States Patent
Kubo et al.

(10) Patent No.: US 7,590,858 B2
(45) Date of Patent: *Sep. 15, 2009

(54) AUTHENTICATION APPARATUS, USER AUTHENTICATION METHOD, USER AUTHENTICATION CARD AND STORAGE MEDIUM

(76) Inventors: Takeshi Kubo, c/o Fujitsu Limited, 1-1, Kamikodanaka 4-chome, Nakahara-ku, Kawasaki-shi, Kanagawa, 211-8588 (JP); Kazuhiro Igarashi, c/o Fujitsu Limited, 1-1, Kamikodanaka 4-chome, Nakahara-ku, Kawasaki-shi, Kanagawa, 211-8588 (JP); Hideyuki Saso, c/o Fujitsu Limited, 1-1, Kamikodanaka 4-chome, Nakahara-ku, Kawasaki-shi, Kanagawa, 211-8588 (JP)

( * ) Notice: Subject to any disclaimer, the term of this patent is extended or adjusted under 35 U.S.C. 154(b) by 535 days.

This patent is subject to a terminal disclaimer.

(21) Appl. No.: 11/362,315

(22) Filed: Feb. 24, 2006

(65) Prior Publication Data

US 2006/0143467 A1 Jun. 29, 2006

Related U.S. Application Data

(63) Continuation of application No. 09/835,128, filed on Apr. 16, 2001, now Pat. No. 7,007,168, which is a continuation of application No. 09/084,323, filed on May 26, 1998, now Pat. No. 6,367,015.

(30) Foreign Application Priority Data

Sep. 10, 1997 (JP) .................................. 9-264839
Apr. 7, 1998 (JP) .................................. 10-94592

(51) Int. Cl.
*H04K 1/00* (2006.01)
*H04L 9/00* (2006.01)
*H04L 9/32* (2006.01)
*G09G 5/00* (2006.01)

(52) U.S. Cl. .............................. 713/183; 726/2; 726/21; 345/173; 345/179

(58) Field of Classification Search ....................... None
See application file for complete search history.

(56) References Cited

U.S. PATENT DOCUMENTS 3,304,411 A 2/1967 Blodgett (Continued)

FOREIGN PATENT DOCUMENTS

EP 0677801 10/1995

(Continued)

OTHER PUBLICATIONS

Partial European Search Report and Annex for application No. 98304268.0-1245/ dated Mar. 31, 2005.

(Continued)

*Primary Examiner*—Christian LaForgia
(74) *Attorney, Agent, or Firm*—Perkins Coie LLP

(57) ABSTRACT

In an authentication apparatus, coordinates input from a coordinate detector via a plurality of discontinuous holes or openings, cutouts or marks provided on a member which is used to specify the coordinates are detected, and an authentication is made based on a comparison result of the detected coordinates and a plurality of registered coordinates.

38 Claims, 31 Drawing Sheets

U.S. PATENT DOCUMENTS

| | | | |
|---|---|---|---|
| 3,350,800 A | | 11/1967 | Witt et al. |
| 3,814,904 A | | 6/1974 | Russell et al. |
| 3,849,631 A | | 11/1974 | Merlino, Jr. et al. |
| 4,656,662 A | * | 4/1987 | Filliman et al. ............. 382/119 |
| 4,817,034 A | | 3/1989 | Hardin, Sr. et al. |
| 5,056,142 A | | 10/1991 | Lapointe et al. |
| 5,195,133 A | | 3/1993 | Kapp et al. |
| 5,297,202 A | | 3/1994 | Kapp et al. |
| 5,559,961 A | | 9/1996 | Blonder |
| 5,603,053 A | | 2/1997 | Gough et al. |
| 5,712,627 A | | 1/1998 | Watts |
| 5,970,146 A | * | 10/1999 | McCall et al. ............... 713/194 |
| 6,367,015 B1 | * | 4/2002 | Kubo et al. ................. 713/183 |
| 6,484,936 B1 | | 11/2002 | Nicoll et al. |
| 7,007,168 B2 | * | 2/2006 | Kubo et al. ................. 713/183 |

FOREIGN PATENT DOCUMENTS

| | | |
|---|---|---|
| EP | 0690368 | 1/1996 |
| FR | 2636795 | 3/1990 |
| JP | 60-71952 | 5/1985 |
| JP | 60-116082 | 6/1985 |
| JP | 60-171560 | 9/1985 |
| JP | 61-296453 | 12/1986 |
| JP | 63-231562 | 9/1988 |
| JP | 4-62677 | 2/1992 |
| JP | 4-98389 | 3/1992 |
| JP | 6-230846 | 8/1994 |
| JP | 7-64691 | 3/1995 |
| JP | 7-84661 | 3/1995 |
| JP | H07-84661 | 3/1995 |
| JP | 7-182098 | 7/1995 |
| JP | H07-200129 | 8/1995 |
| JP | 7-254955 | 10/1995 |
| JP | H07-254955 | 10/1995 |
| JP | 7-295721 | 11/1995 |
| JP | H08-249284 | 9/1996 |
| JP | H08-328725 | 12/1996 |
| JP | 9-44304 | 2/1997 |
| JP | 90-54862 | 2/1997 |
| JP | H09-54862 | 2/1997 |
| WO | WO 97/30429 | 8/1997 |

OTHER PUBLICATIONS

European Search Report and Annex for application No. 98304268.0-2212/ dated Aug. 12, 2005.

* cited by examiner

| LOCATION No. | POINT No. | COORDINATE |
|---|---|---|
| 1 | 1 | $(x_{11}, y_{11})$ |
| 1 | 2 | $(x_{12}, y_{12})$ |
| 2 | 1 | $(x_{21}, y_{21})$ |
| 2 | 2 | $(x_{22}, y_{22})$ |
| 3 | 1 | $(x_{31}, y_{31})$ |
| 3 | 2 | $(x_{32}, y_{32})$ |
| 4 | 1 | $(x_{41}, y_{41})$ |
| 4 | 2 | $(x_{42}, y_{42})$ |

| No. | COORDINATE |
|---|---|
| 1 | $(x_1, y_1)$ |
| 2 | $(x_2, y_2)$ |
| 3 | $(x_3, y_3)$ |
| 4 | $(x_4, y_4)$ |

FIG. 10A
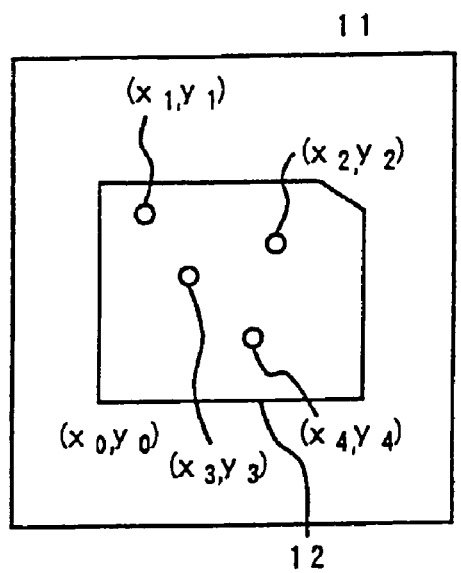
FIG. 10B
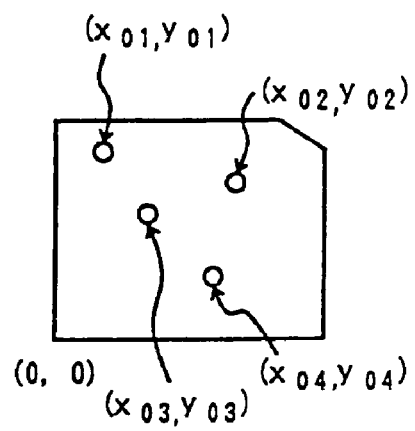
FIG. 10C
| POINT No. | CARD ORIGIN | HOLE COORDINATE VALUE WITHIN CARD | COMPARISON COORDINATE |
|---|---|---|---|
| 1 | $(x_0, y_0)$ | $(x_{01}, y_{01})$ | $(x_1, y_1) = (x_0 + x_{01}, y_0 + y_{01})$ |
| 2 |  | $(x_{02}, y_{02})$ | $(x_2, y_2) = (x_0 + x_{02}, y_0 + y_{02})$ |
| 3 |  | $(x_{03}, y_{03})$ | $(x_3, y_3) = (x_0 + x_{03}, y_0 + y_{03})$ |
| 4 |  | $(x_{04}, y_{04})$ | $(x_4, y_4) = (x_0 + x_{04}, y_0 + y_{04})$ |
REGISTERED DATA
DATA RECEIVED FROM CPU
OBTAIN DATA FOR COMPARISON WITH ACTUALLY DETECTED COORDINATE FOR AUTHENTICATION BY CALCULATION PRIOR TO AUTHENTICATION

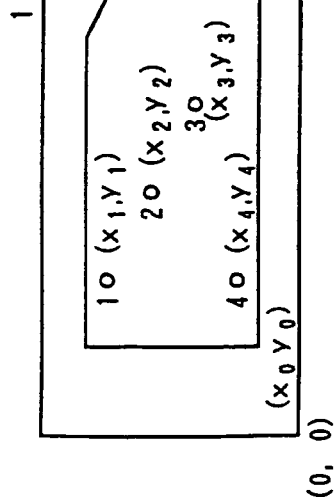
FIG. 12A
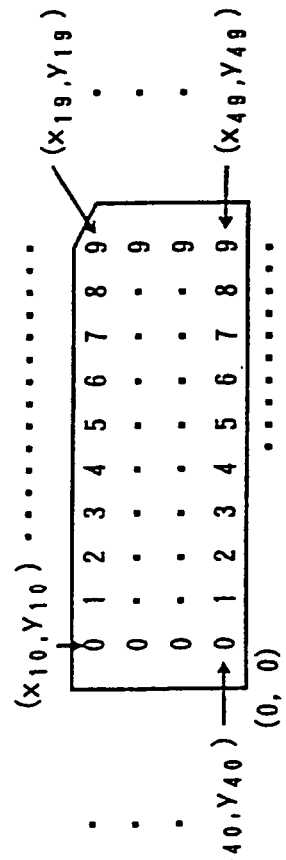
FIG. 12B
FIG. 12C
FIG. 12D
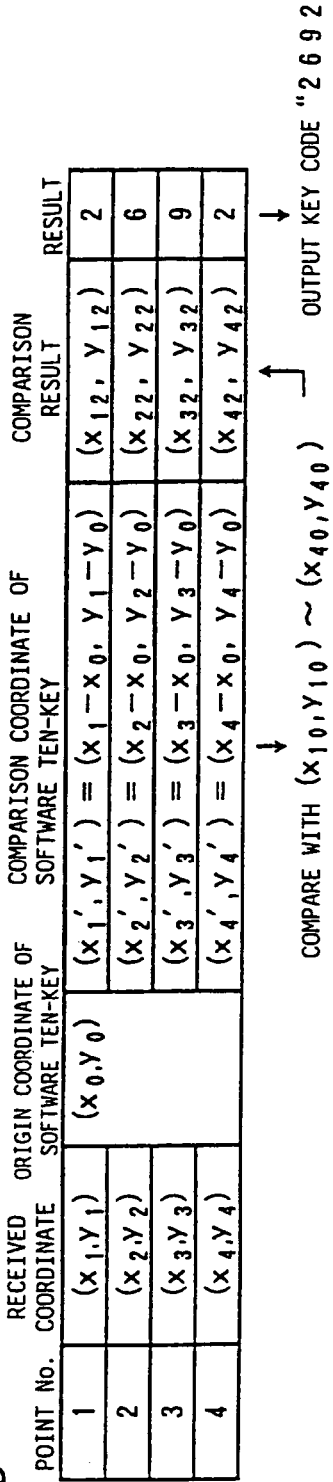

| POINT NO. | DETECTED COORDINATE | CARD ORIGIN COORDINATE FROM CPU | COMPARISON COORDINATE OF SOFTWARE TEN-KEY | COMPARISON RESULT | |
|---|---|---|---|---|---|
| 1 | $(x_1, y_1)$ | $(x_0, y_0)$ | $(x_1', y_1') = (x_1 - x_0, y_1 - y_0)$ | $(x_{12}, y_{12})$ | 2 |
| 2 | $(x_2, y_2)$ | | $(x_2', y_2') = (x_2 - x_0, y_2 - y_0)$ | $(x_{26}, y_{26})$ | 6 |
| 3 | $(x_3, y_3)$ | | $(x_3', y_3') = (x_3 - x_0, y_3 - y_0)$ | $(x_{39}, y_{39})$ | 9 |
| 4 | $(x_4, y_4)$ | | $(x_4', y_4') = (x_4 - x_0, y_4 - y_0)$ | $(x_{42}, y_{42})$ | 2 |

| SECURITY LEVEL | TOLERABLE RANGE |
|---|---|
| 1 | $(\Delta x_1, \Delta y_1)$ |
| ⋮ | ⋮ |
| m | $(\Delta x_m, \Delta y_m)$ |
| ⋮ | ⋮ |
| $\ell$ | $(\Delta x_\ell, \Delta y_\ell)$ |

WHERE  $\Delta x_1 > \cdots > \Delta x_m > \cdots > \Delta x_\ell$
$\Delta y_1 > \cdots > \Delta y_m > \cdots > \Delta y_\ell$

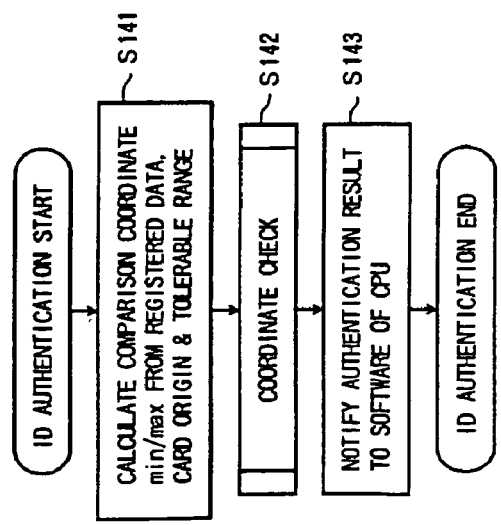

FIG. 19A

| POINT NO. | CARD ORIGIN | REGISTERED DATA OF HOLE COORDINATES WITHIN CARD | COMPARISON COORDINATE RANGE | |
|---|---|---|---|---|
| | | | min | max |
| 1 | $(x_0, y_0)$ | $(x_{01}, y_{01})$ | $(x_0 - \Delta x_0 + x_{01}, y_0 - \Delta y_0 + y_{01})$ | $(x_0 + \Delta x_0 + x_{01}, y_0 + \Delta y_0 + y_{01})$ |
| 2 | | $(x_{02}, y_{02})$ | $(x_0 - \Delta x_0 + x_{02}, y_0 - \Delta y_0 + y_{02})$ | $(x_0 + \Delta x_0 + x_{02}, y_0 + \Delta y_0 + y_{02})$ |
| 3 | TOLERABLE RANGE | $(x_{03}, y_{03})$ | $(x_0 - \Delta x_0 + x_{03}, y_0 - \Delta y_0 + y_{03})$ | $(x_0 + \Delta x_0 + x_{03}, y_0 + \Delta y_0 + y_{03})$ |
| 4 | $(\Delta x_0, \Delta y_0)$ | $(x_{04}, y_{04})$ | $(x_0 - \Delta x_0 + x_{04}, y_0 - \Delta y_0 + y_{04})$ | $(x_0 + \Delta x_0 + x_{04}, y_0 + \Delta y_0 + y_{04})$ |

FIG. 19B

ID AUTHENTICATION START → CALCULATE COMPARISON COORDINATE min/max FROM REGISTERED DATA, CARD ORIGIN & TOLERABLE RANGE (S141) → COORDINATE CHECK (S142) → NOTIFY AUTHENTICATION RESULT TO SOFTWARE OF CPU (S143) → ID AUTHENTICATION END

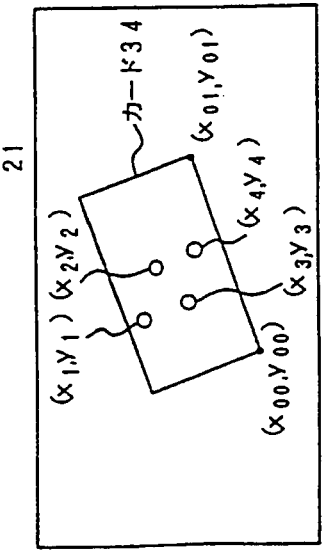

FIG. 24A

| POINT DETECTED No. COORDINATE | CARD POSITION DETECTION COORDINATE | SOFTWARE TEN-KEY COMPARISON COORDINATE | COMPARISON RESULT | NUMERICAL VALUE |
|---|---|---|---|---|
| 1 $(x_1, y_1)$ | $(x_{00}, y_{00})$<br>$(x_{01}, y_{01})$ | $(x_1', y_1')$<br>$= (x_{00}', x_1\cos\Delta\theta - y_1\sin\Delta\theta, y_{00}', x_1\sin\Delta\theta + y_1\cos\Delta\theta)$ | $(x_{12}, y_{12})$ | 2 |
| 2 $(x_2, y_2)$ | $\sin\Delta\theta = \dfrac{y_{01} - y_{00}}{\ell_0}$ | $(x_2', y_2')$<br>$= (x_{00}', x_2\cos\Delta\theta - y_2\sin\Delta\theta, y_{00}', x_2\sin\Delta\theta + y_2\cos\Delta\theta)$ | $(x_{22}, y_{22})$ | 6 |
| 3 $(x_3, y_3)$ | $\cos\Delta\theta = \dfrac{x_{01} - x_{00}}{\ell_0}$ | $(x_3', y_3')$<br>$= (x_{00}', x_3\cos\Delta\theta - y_3\sin\Delta\theta, y_{00}', x_3\sin\Delta\theta + y_3\cos\Delta\theta)$ | $(x_{32}, y_{32})$ | 9 |
| 4 $(x_4, y_4)$ | $\ell_0$: DISTANCE BETWEEN POSITIONING HOLES | $(x_4', y_4')$<br>$= (x_{00}', x_4\cos\Delta\theta - y_4\sin\Delta\theta, y_{00}', x_4\sin\Delta\theta + y_4\cos\Delta\theta)$ | $(x_{42}, y_{42})$ | 2 |

| POINT DETECTED NO. | DETECTED COORDINATE | CARD POSITION DETECTION COORDINATE | COMPARISON COORDINATE | REGISTERED COORDINATE | OUTPUT KEY CODE AFTER ID AUTHENTICATION |
|---|---|---|---|---|---|
| 1 | $(x_1, y_1)$ | $(x_{00}, y_{00})$ $(x_{01}, y_{01})$ $\sin\Delta\theta = \dfrac{y_{01} - y_{00}}{\ell_0}$ | $(x_1', y_1') = (x_{00} + x_1\cos\Delta\theta - y_1\sin\Delta\theta,\ y_{00} + x_1\sin\Delta\theta + y_1\cos\Delta\theta)$ | $(x_1, Y_1)$ | 2 |
| 2 | $(x_2, y_2)$ | | $(x_2', y_2') = (x_{00} + x_2\cos\Delta\theta - y_2\sin\Delta\theta,\ y_{00} + x_2\sin\Delta\theta + y_2\cos\Delta\theta)$ | $(x_2, Y_2)$ | 6 |
| 3 | $(x_3, y_3)$ | $\cos\Delta\theta = \dfrac{y_{01} - y_{00}}{\ell_0}$ | $(x_3', y_3') = (x_{00} + x_3\cos\Delta\theta - y_3\sin\Delta\theta,\ y_{00} + x_3\sin\Delta\theta + y_3\cos\Delta\theta)$ | $(x_3, Y_3)$ | 9 |
| 4 | $(x_4, y_4)$ | $\ell_0$: DISTANCE BETWEEN POSITIONING HOLES | $(x_4', y_4') = (x_{00} + x_4\cos\Delta\theta - y_4\sin\Delta\theta,\ y_{00} + x_4\sin\Delta\theta + y_4\cos\Delta\theta)$ | $(x_4, Y_4)$ | 2 |

AUTHENTICATION APPARATUS, USER AUTHENTICATION METHOD, USER AUTHENTICATION CARD AND STORAGE MEDIUM

CROSS-REFERENCE TO RELATED APPLICATIONS

This application is a continuation of U.S. application Ser. No. 09/835,128, filed Apr. 16, 2001 now U.S. Pat. No. 7,007, 168, which is a continuation of U.S. application Ser. No. 09/084,323, filed May 26, 1998, which issued on Apr. 2, 2002, as U.S. Pat. No. 6,367,015.

This application is based upon and claims priority to Japanese Application Ser. No. 9-264839, filed Sep. 10, 1997, Japanese Application Ser. No. 10-94592, filed April 7, 1998, U.S. application Ser. No. 09/084,323, filed May 26, 1998, which issued on Apr. 2, 2002, as U.S. Pat. No. 6,367,015 and U.S. application Ser. No. 09/835,128, filed Apr. 16, 2001, the contents being incorporated herein by reference.

BACKGROUND OF THE INVENTION

The present invention generally relates to authentication apparatuses, user authentication methods, user authentication cards and storage mediums, and more particularly to an authentication apparatus, a user authentication method for an authentication apparatus, a user authentication card, and a storage medium storing a program for user authentication.

Conventionally, the security function provided in a personal computer (PC) generally carries out the authentication by inputting a password or a user identification (ID) from a keyboard. According to this conventional method, the password or user ID defined by the user is made secret to a third party, and various accesses are started and carried out responsive to the authentication made with respect to an input made from a screen of the personal computer or the like.

However, if the password or the user ID, which is a string of characters or numbers, becomes known to the third party, the authentication may easily be given to the third party, and there was a problem in that the reliability of the security provided may not be sufficiently high.

In order to solve these problems of the prior art, it is an object of the present invention to improve the reliability of the security by use of a key peculiar to the user and to carry out an authentication with a high security in a simple manner by carrying a card set with the key, by carrying out the authentication by collating with registered coordinate patterns or the like a coordinate pattern input from a tablet or a touch panel of an apparatus which is capable of detecting coordinates such as a pen input type personal computer (pen PC) and an apparatus having the tablet or, a coordinate pattern which is input from holes or openings, cutouts and marks of the card.

SUMMARY OF THE INVENTION

Accordingly, it is a general object of the present invention to provide a novel and useful authentication apparatus, user authentication method, user authentication card and storage medium, in which the problems described above are eliminated.

Another and more specific object of the present invention is to provide an authentication apparatus comprising detecting means for detecting coordinates input from a coordinate detector via a member which specifies a plurality of discontinuous different coordinates, comparing means for comparing the detected coordinates and a plurality of registered coordinates, and authentication means for carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Still another object of the present invention is to provide an authentication apparatus comprising detecting means for detecting coordinates input from a coordinate detector by a pen via a member which specifies a plurality of discontinuous different coordinates, comparing means for comparing the detected coordinates and a plurality of registered coordinates, and authentication means for carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

A further object of the present invention is to provide a user authentication method comprising a detecting step detecting coordinates input from a coordinate detector via a member which specifies a plurality of discontinuous different coordinates, a comparing step comparing the detected coordinates and a plurality of registered coordinates, and an authentication step carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Another object of the present invention is to provide a user authentication method comprising a detecting step detecting coordinates input from a coordinate detector by a pen via a member which specifies a plurality of discontinuous different coordinates, a comparing step comparing the detected coordinates and a plurality of registered coordinates, and an authentication step carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Still another object of the present invention is to provide a user authentication card which is placed on a coordinate detector when making an input for user authentication, comprising a plurality of perforated parts, where each of perforated parts removed by punching forms a hole which is used when making an input to the coordinate detector. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

A further object of the present invention is to provide a computer readable storage medium storing a program for making a computer detect coordinates, comprising detecting means for making the computer detect coordinates input from a coordinate detector via a member which specifies a plurality of discontinuous different coordinates, comparing means for making the computer compare the detected coordinates and a plurality of registered coordinates, and authentication means for making the computer carry out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Another object of the present invention is to provide a computer readable storage medium storing a program for making a computer detect coordinates, comprising detecting means for making the computer detect coordinates input from a coordinate detector by a pen via a member which specifies a plurality of discontinuous different coordinates, comparing means for making the computer compare the detected coordinates and a plurality of registered coordinates, and authentication means for making the computer carry out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Still another object of the present invention is to provide an authentication apparatus comprising detecting means for detecting coordinates input by a member having a plurality of projections, comparing means for comparing the detected coordinates and registered coordinates, and authentication means for carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

A further object of the present invention is to provide a user authentication method comprising a detecting step detecting coordinates input by a member having a plurality of projections, a comparing step comparing the detected coordinates and registered coordinates, and an authentication step carrying out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Another object of the present invention is to provide a computer readable storage medium storing a program for making a computer detect coordinates, comprising detecting means for making the computer detect coordinates input by a member having a plurality of projections, comparing means for making the computer compare the detected coordinates and registered coordinates, and authentication means for making the computer carry out an authentication based on a compared result. Since the present invention makes the authentication by collating the coordinate pattern which is input via the holes, cutouts or the like of the member such as a card and the registered coordinate pattern, it is possible to improve the reliability of the security by use of a key unique to the user. In addition, the security with the high reliability can be achieved simply by a portable member such as a card set with the key.

Other objects and further features of the present invention will be apparent from the following detailed description when read in conjunction with the accompanying drawings.

BRIEF DESCRIPTION OF THE DRAWINGS

FIGS. 10A through 10C respectively are diagrams for explaining a data structure for a case where the software of the CPU notifies the card position in the present invention;

FIGS. 12A through 12D respectively are diagrams for explaining a data structure for a case where a card is placed on the software ten-key which is not displayed and a key code is notified in the present invention;

FIGS. 19A and 19B respectively are diagrams for explaining a process of setting a range of a relative coordinate in the present invention;

FIGS. 24A and 24B respectively are diagrams for explaining the data structure for a case where the card position may be an arbitrary position on the tablet in the present invention;

FIG. 28 is a diagram for explaining the process of increasing the number of IDs to be authenticated in the present invention;

DETAILED DESCRIPTION OF THE PREFERRED EMBODIMENTS

A description will be given of the means of solving the problems, by referring to FIG. 1.

Figure 1:
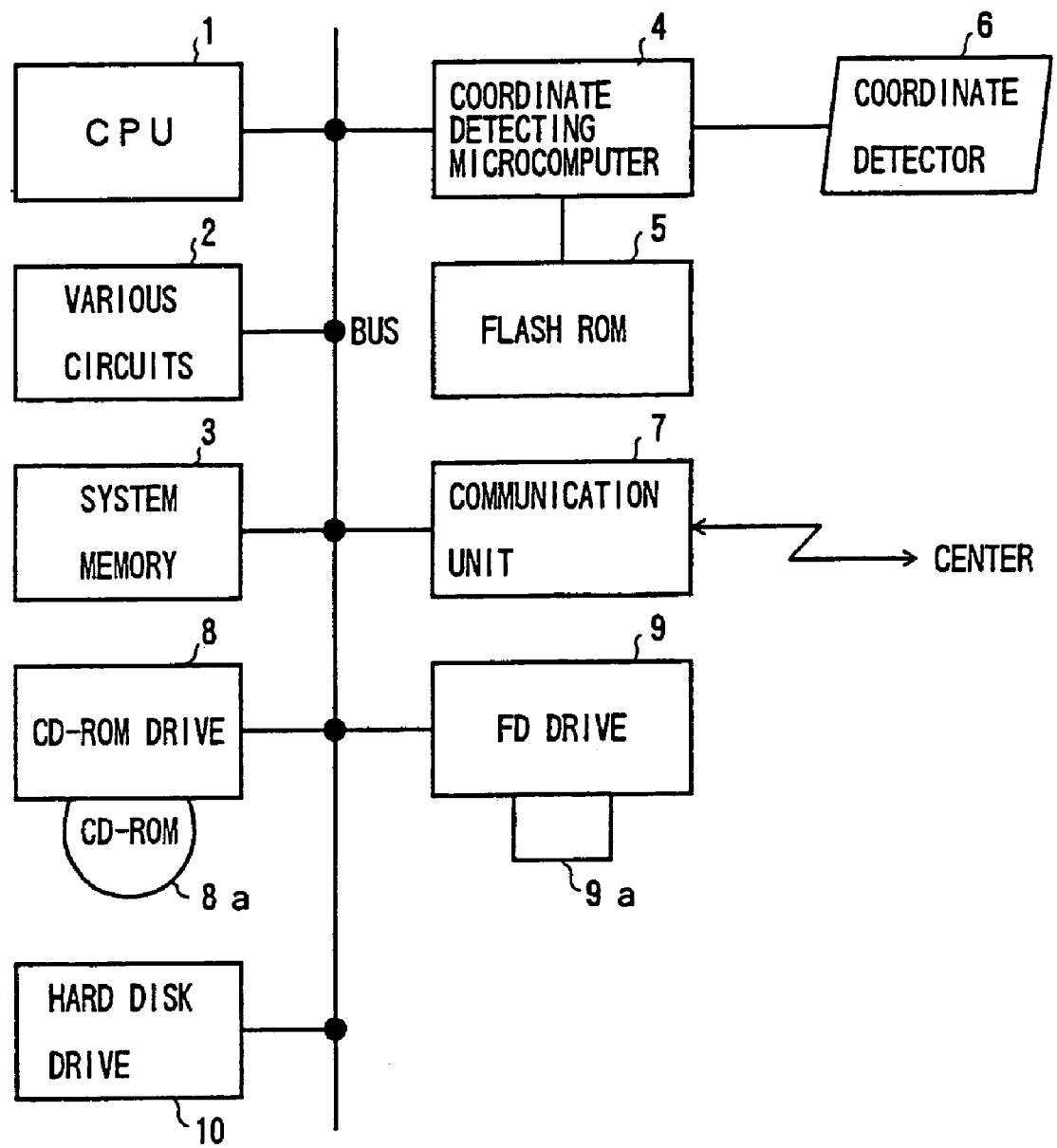
FIG. 1 is a system block diagram showing the present invention.

In FIG. 1, a central processing unit (CPU) 1 carries out various kinds of processes depending on programs. More particularly, the CPU 1 carries out processes including comparing a read coordinate and registered coordinates, and carrying out an authentication based on a compared result.

A coordinate detecting microcomputer 4 detects coordinates based on signals from a coordinate detector 6, depending on programs. In addition, the comparison and authentication are not carried out solely by the CPU 1, but an authentication is carried out based on a compared result of a local process carried out by the coordinate detecting microcomputer 4.

The coordinate detector 6 detects a coordinate input from a screen. The screen includes a screen for displaying an image by a CRT or liquid crystal, a screen which includes a surface for detecting the coordinate such as a tablet, and a screen having a touch panel provided on a display unit. Accordingly, the coordinate detector 6 shown in FIG. 1 includes a display part and an input part.

Next, a description will be given of the operation of a computer system shown in FIG. 1.

The coordinate detecting microcomputer 4 reads (or detects) the coordinate input from the coordinate detector 6. The CPU 1 compares the plurality of read (or detected) coordinates and a plurality of registered coordinates, and carries out an authentication based on a compared result.

The CPU 1 may compare an order of the plurality of read coordinates and an order of the registered coordinates, and carry out the authentication based on the compared result.

In addition, the coordinate detecting microcomputer 4 may judge an end of the input of the plurality of coordinates when an input interval of the plurality of read coordinates becomes longer than a predetermined interval or, the input interval of the plurality of read coordinates becomes longer than an average value of the input interval.

Furthermore, a card provided with a plurality of discontinuous holes or openings, cutouts or marks may be placed on the coordinate detector 6, and the coordinate detecting microcomputer 4 may read the input coordinates based on inputs made via the holes or openings, cutouts or marks.

That is, the hole may penetrate the card or, the hole may be a cavity which does not penetrate the card, as long as the coordinate can be specified. In the case of the pen PC which will be described later, there are the resistor layer type, electrostatic coupling type, electromagnetic induction type and the like. For example, in the case of the electromagnetic induction type, the coordinate is detected by sensing magnetism of a pointing device (a pen or stylus) by a coordinate detector which is arranged below the screen, and the magnetism can be sensed even if the pen does not make direct contact with the screen. Hence, in this case, the card does not necessarily have to be provided with a penetrating hole, and the hole may be a cavity or the like which does not penetrate the card. In addition, a mark may be provided on the card in place of the hole.

Moreover, when the card provided with the plurality of discontinuous holes or openings, cutouts or marks is placed in a specified region on the coordinate detector 6, the coordinate detecting microcomputer 4 may read the coordinates input based on the holes or openings, cutouts or marks. In this case, the CPU 1 compares the read coordinate pattern and registered coordinate patterns, and carry out the authentication based on the compared result.

The plurality of discontinuous holes or openings, cutouts or marks may be provided arbitrarily positions on the card.

The specified region may be a predetermined region decided by a random number.

The specified region may be decided based on four corners of the screen and a random number.

When the card provided with the plurality of discontinuous holes or openings, cutouts or marks is placed in a specified region which is arbitrarily movable on the coordinate detector 6, the coordinate detecting microcomputer 4 may read the coordinates input based on the holes or openings, cutouts or marks. In this case, the CPU 1 compares the read coordinate pattern and registered coordinate patterns, and carry out the authentication based on the compared result.

In addition, when the card provided with a plurality of discontinuous holes or openings, cutouts or marks is placed on the coordinate detector 6 based on a keyboard position marker set on the coordinate detector 6, the coordinate detecting microcomputer 4 may read (output) a code corresponding to a non-displaying key of the keyboard input based on the coordinates specified via the holes or openings, cutouts or marks of the card. In this case, the CPU 1 compares the code read (output) by the coordinate detecting microcomputer 4 and registered codes, and carries out the authentication based on a compared result of the codes.

In this case, the CPU 1 may register user levels and a manager level which is common to all of the user levels, with respect to the plurality of registered coordinates, registered coordinate patterns or registered code values.

In addition, when the card provided with a plurality of discontinuous holes or openings, cutouts or marks is placed on the coordinate detector 6, the coordinate detecting microcomputer 4 may read the coordinates input based the holes or openings, cutouts or marks of the card. In this case, the CPU 1 compares the read coordinate pattern and patterns which are determined by the specified position and registered patterns, based one or more arbitrary ones of the detected coordinates, and carries out the authentication depending on a compared result.

Moreover, when the card provided with a plurality of discontinuous holes or openings, cutouts or marks is placed on the coordinate detector 6, the coordinate detecting microcomputer 4 may virtually set a keyboard at a position indicated by one or a plurality of arbitrary inputs made from the coordinate detector 6 via the card which is placed on the coordinate detector 6 and specifies the plurality of discontinuous different coordinates, and detect a code corresponding to each key located at a position where the one or plurality of arbitrary inputs are made based on the virtually set keyboard. In this case, the CPU 1 compares each detected code with registered codes and carries out an authentication based on a compared result.

The coordinate detecting microcomputer 4 may detect resistances corresponding to the coordinates input from a resistor layer type coordinate detector 6 via the card. In this case, the CPU 1 compares the plurality of detected coordinates and the registered coordinates by comparing the detected resistances and registered resistances, and carries out an authentication based on a compared result.

Accordingly, it is possible to improve the reliability of the security by use of a key peculiar to the user and to carry out an authentication with a high security in a simple manner by carrying a card set with the key, by carrying out the authentication by collating with registered coordinate patterns or the like a coordinate pattern input from based on holes or openings, cutouts and marks of the card.

Figure 29:
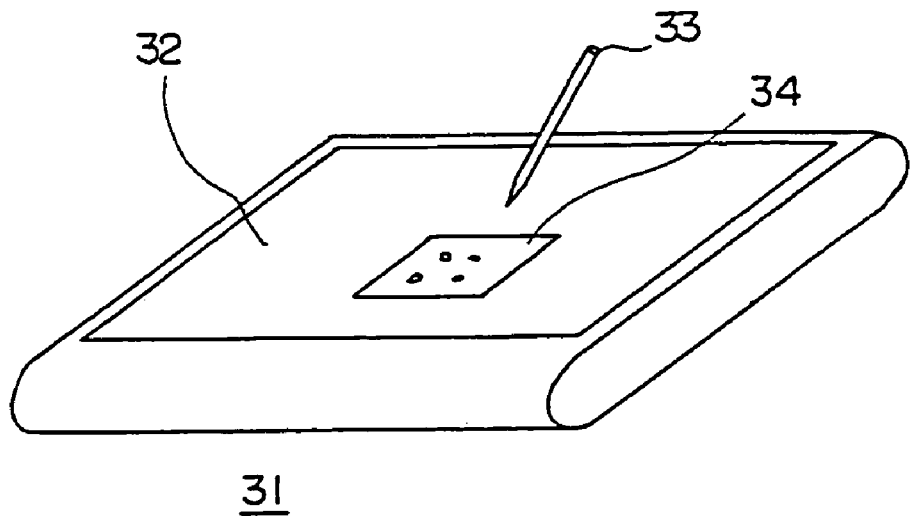
FIG. 29 is a diagram showing a first application of the present invention.

On the other hand, FIG. 29 shows a case where the present invention is applied to a pen PC. In this case, a card (or ID card) 34 or the like is placed on a screen 32 of a pen PC 31, and positions of holes or openings, cutouts or marks of the card 34 are pushed by a pen 33. The coordinates of the pushed positions are detected by sensing the magnetism of the pen 33 by a transparent coordinate detector arranged on the screen 32 or, by a non-transparent coordinate detector arranged below the screen 32 in the case of the electromagnetic induction type. Hence, it is possible to carry out an authentication by comparing the detected coordinates with a registered ID or the like, as described above. It is possible to display on the screen 32 a card frame, a position marker or the like which indicate the position where the card 34 is to be placed. In this case, the card 34 is placed within the displayed card frame, for example, and the positions of the holes or openings, cutouts or marks of the card 34 may be pushed by the pen 33. On the other hand, instead of displaying the card frame, it is possible to virtually set a card frame, a soft ten-key frame or the like based on one or more arbitrary positions of the holes or openings, cutouts or marks of the card 34 pushed by the pen 33. In any case, the pushed coordinates are detected based on the displayed frame or position marker or, the frame or position marker which is virtually set internally, and the authentication is carried out by comparing the detected coordinates and the registered coordinates.

It is easy and convenient to carry the card (or ID card) 34 if the card 34 has a shape and dimension approximately identical to those of a generally used credit card.

Figure 30:
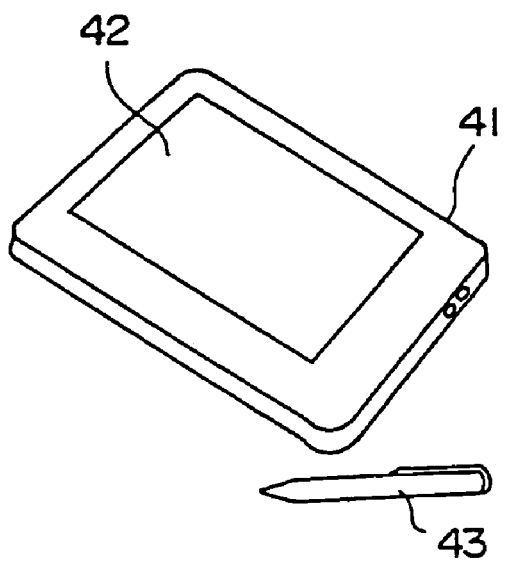
FIG. 30 is a diagram showing a second application of the present invention.

FIG. 30 shows an application of the present invention. A portable pen input type computer 41 shown in FIG. 30, for example, has already been developed. The pen input type computer 41 is mounted with a display part 42 made of a thin liquid crystal display panel having B5 or A4 size, for example. A transparent touch panel which is not shown is provided to cover a front face of this display part 42. When an output pen 43 is moved to a close proximity of, touches or, lightly pushes on this touch panel, it is possible to detect the coordinate indicated by the pen 43. The display part 42 is of course not limited to the liquid crystal display, and the present invention is similarly applicable to cases where the display part 42 is made of a plasma discharge panel or a CRT. The pen input type computer 41 may have an internal structure shown in FIG. 1, for example. In addition, the present invention is not only applicable to the pen input type computer 41, but is similarly applicable to a word processor, and electronic notebook or diary, a desk top apparatus couple to a coordinate detecting apparatus, and various kinds of programmable apparatus having a coordinate detecting apparatus such as cash dispensers.

Furthermore, the types of computer input roughly include the resistor layer type, the electrostatic coupling type and the electromagnetic induction type, but the present invention may employ any of such types of computer input. Moreover, the input is not limited to a pen input, and the present invention is applicable to a touch panel or the like which receives an input by the user's finger tips.

Next, a detailed description will be given of the embodiments of the present invention and the operation thereof, by referring to FIGS. 1 through 30.

FIG. 1 is a system block diagram showing the present invention.

FIG. 1, a CPU 1 carries out various processes depending on a program. A program read from a CD-ROM Ba by a CD-ROM drive 8, a program read from a floppy disk (FD) 9a by a floppy disk (FD) drive 9 or, a program downloaded from a center via a communication unit 7 is loaded into a hard disk of a hard disk drive 10, and the CPU 1 carries out the various processes described with reference to FIGS. 2 through 22 by reading the loaded program from the hard disk.

Various circuits 2 are made up of circuits which are necessary for the CPU 1 to carry out the various processes. For example, the various circuits 2 include input/output (I/O) controllers (not shown) such as a display controller and a keyboard controller.

A system memory 3 and the hard disk of the hard disk drive 10 store programs and data.

A coordinate detecting microcomputer 4 carries out various processes depending on a program stored in a flash ROM 5 or the like.

The flash ROM 5 stores programs and the like. A non-volatile memory such as a EEPROM and a mask ROM may be used in place of the flash ROM 5. In addition, an internal ROM of the coordinate detecting microcomputer 4 may be used in place of the flash ROM 5. Actually, a coordinate input apparatus such as a tablet is provided with a rewritable non-volatile memory such as a flash ROM and an EEPROM for storing correction data used at the time of the coordinate detection, that is, the correction data indicating the characteristic for each individual tablet, and the coordinate detection is corrected using the correction data. Hence, it is possible to store registration data which will be described later together with the correction data and use the registration data together with the correction data at the time of the coordinate detection.

A coordinate detector 6 detects a coordinate value which is input, and in the case of a resistor type, detects a resistance corresponding to the input coordinate. This coordinate detector 6 detects the coordinate value which is input from a screen which is displayed on the CRT, a screen which is displayed on a liquid crystal display or a tablet. In this specification, the coordinate detector 6 refers to a detector which detects the coordinate of the screen displayed on the CRT, the screen displayed on the liquid crystal display, the touch panel, the tablet, the resistor type tablet and the like. For example, the coordinate detector 6 may detect the coordinate of a touch panel having a thin film resistor type digitizer arranged on a liquid crystal display or a plasma display or, a touch panel having an electromagnetic induction type digitizer arranged below a liquid crystal display or a plasma discharge panel. In the case of the electromagnetic induction type, the coordinate on the screen (for example, a liquid crystal display) is detected by a coordinate detector 6 which is arranged below the screen by sensing the magnetism of a pen (or stylus).

An authentication apparatus according to the present invention includes at least the coordinate detecting microcomputer 4, the flash ROM 5 (or memory), and the coordinate detector 6, and is applicable to a pen PC and a personal computer provided with a display unit. In a preferred embodiment, the present invention is applied to a personal computer having a touch panel or a tablet which enables direct pointing of a display screen by a pen or finger, such as a portable pen PC and an electronic notebook or diary.

The communication unit 7 exchanges programs and data between the center.

The CD-ROM drive 8 carries out operations such as reading the program from the CD-ROM 8a and storing the read program into the system memory 3.

The floppy disk drive 9 carries out operations such as reading the program from the floppy disk 9a and storing the read program into the system memory 3. A more detailed description of these parts will follow hereunder.

In FIG. 1, the communication unit 7, the CD-ROM drive 8, the floppy disk drive 9 and the like may be provided as external units which are coupled externally to the apparatus such as the personal computer. In addition, it is of course possible to form the CPU 1 and the coordinate detecting microcomputer 4 by a single CPU. Similarly, the system memory 3 and the flash ROM 5 may be formed by a single memory.

Figure 2:
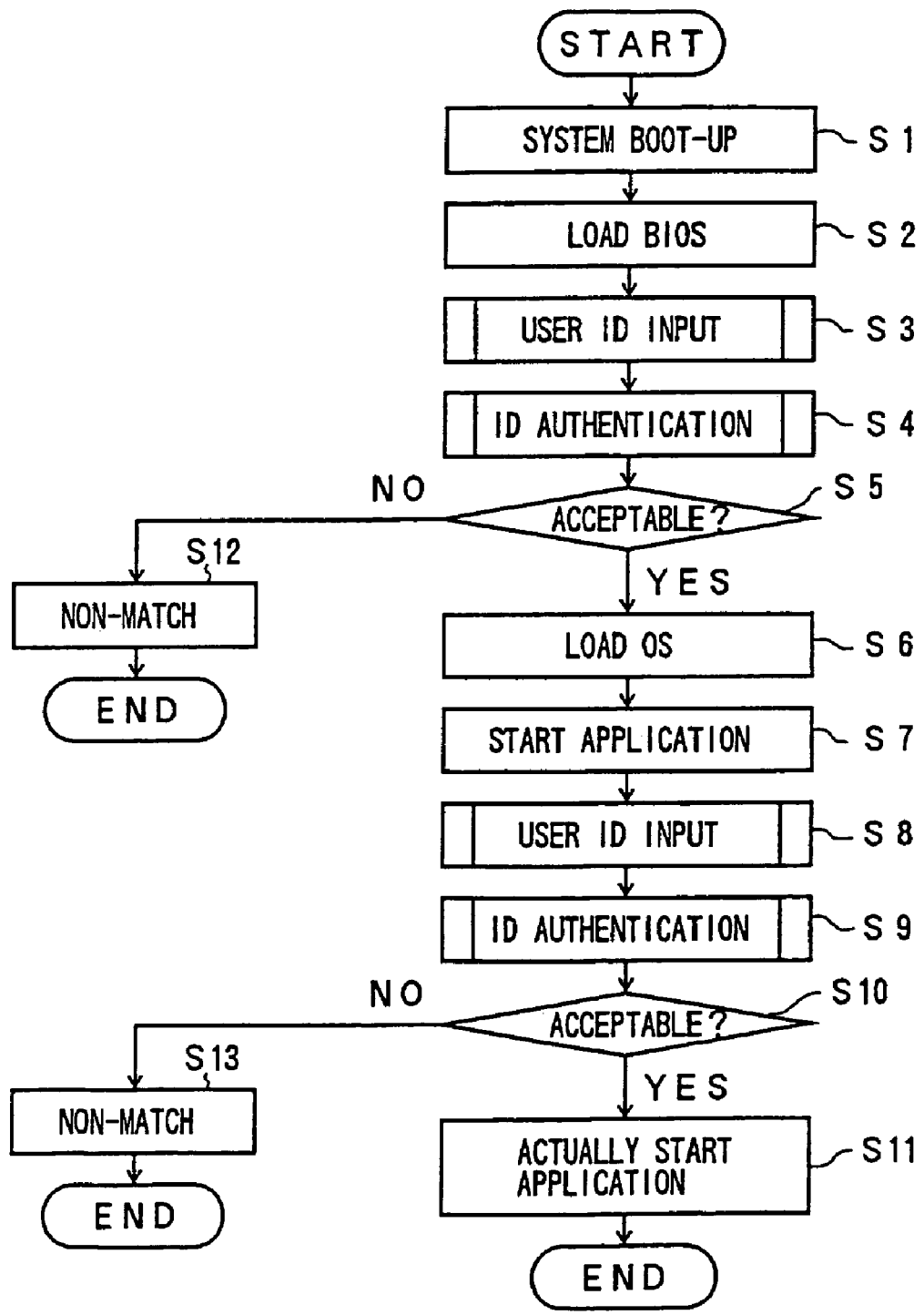
FIG. 2 is a flow chart for explaining the general operation of the present invention.

FIG. 2 is a flow chart for explaining the general operation of the present invention.

In FIG. 2, a step S1 carries out a system boot-up.

A step S2 loads an input/output control program (BIOS). More particularly, the BIOS is read from a non-volatile memory such as a flash memory within the various circuits 2, loaded into the system memory 3 and then started, so that the CPU 1 shown in FIG. 1 becomes operative.

A step S3 inputs a user ID. The user ID is input by inputting coordinate values on the coordinate detector 6, as will be described later in conjunction with FIGS. 3 through 22.

A step S4 carries out an ID authentication. More particularly, an authentication is made to determine whether or not the user ID input in the step S3 matches a registered user ID.

A step S5 decides whether or not a result of the authentication made in the step S4 is acceptable. If the decision result in the step S5 is YES, the process advances to a step S6. On the other hand, if the decision result in the step S5 is NO, a step S12 determines that no ID matches, and the process ends so as to prohibit the process from advancing to the step S6.

The step S6 loads an operating system (OS) because the user ID is authenticated in the step S5.

A step S7 starts an application. When starting the application, it is also possible to make an ID authentication similarly to that at the time when the operating system is loaded.

A step S8 inputs a user ID.

A step S9 makes an authentication with respect to the input user ID.

A step S10 decides whether or not a result of the authentication made in the step S9 is acceptable. If the decision result in the step S10 is YES, a step S11 actually starts the application. On the other hand, if the decision result in the step S10 is NO, a step S13 decides that no ID matches, and the process ends so as to prohibit the process from advancing to the step S11. The steps S8 through S10 and S13 respectively correspond to the steps S2 through S5 and S12 described above, and a detailed description thereof will be omitted.

When starting the computer system shown in FIG. 1, the user ID is input and the ID authentication is made according to the present invention after the BIOS is loaded and before the operating system is loaded. Further, the user ID is input and the ID authentication is made according to the present invention when starting the application. Compared to the conventional user ID input which is made by inputting text data which is made up of numbers, alphabets and the like, the present invention inputs the user ID by inputting coordinate values unique to the user. The present invention makes the authentication of the user ID by judging whether or not the input coordinate values or a coordinate value pattern is correct, so as to improve the security of the computer system. The user ID input and the ID authentication will now be described in more detail.

Figure 3:
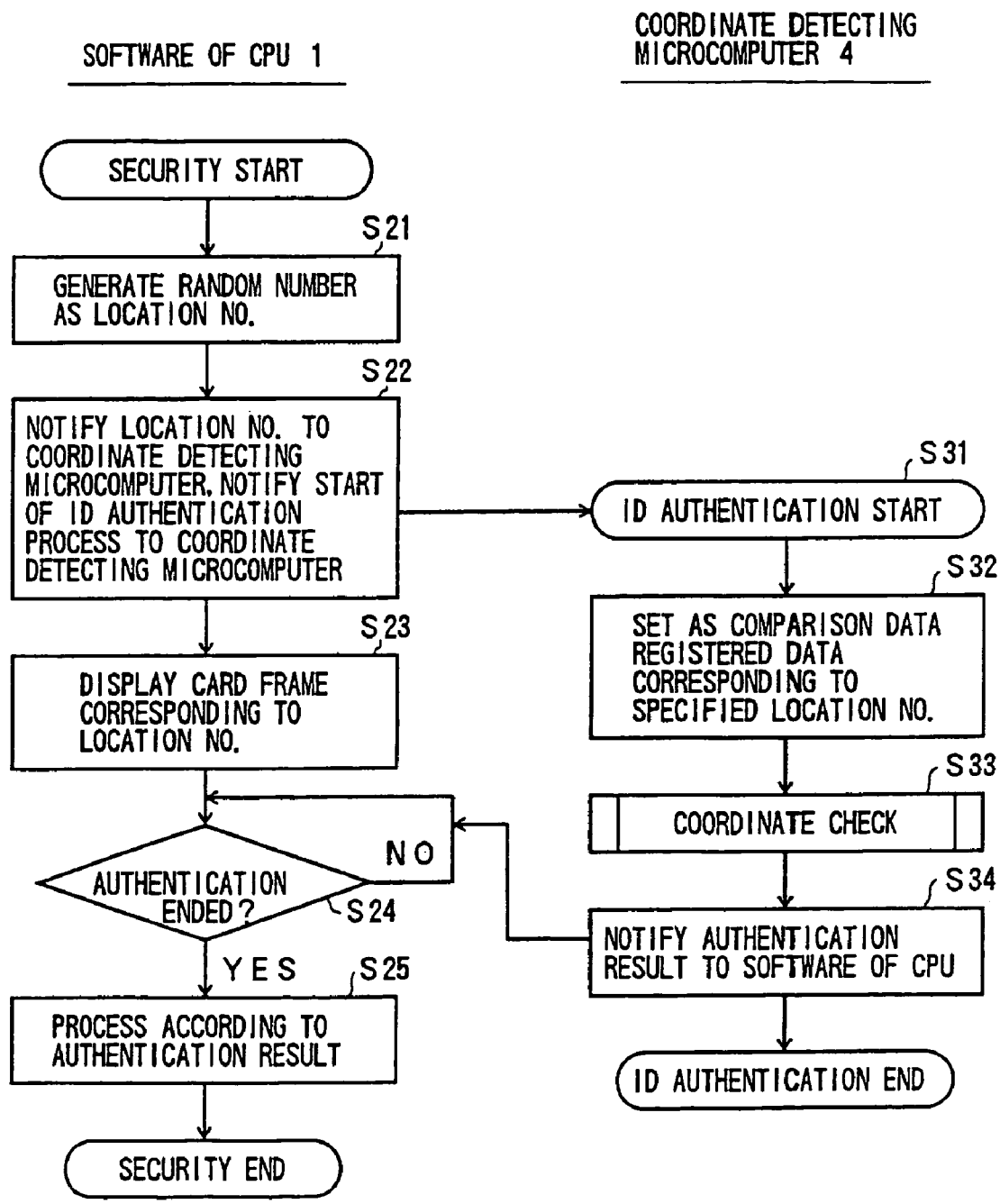
FIG. 3 is a flow chart for explaining a card position change in the present invention.

FIG. 3 is a flow chart for explaining a card position change in the present invention. In FIG. 3, steps shown below "software of the CPU" indicate the software (program) which is read from the system memory 3 and executed by the CPU 1 shown in FIG. 1, and steps shown below "coordinate detecting microcomputer" indicate the program which is read from the flash ROM 5 and executed by the coordinate detecting microcomputer 4 shown in FIG. 1.

In FIG. 3, a step S21 generates a random number as a location number (No.). More particularly, location Nos. 1, 2, 3 and 4 are assigned to the 4 corners of the screen 11 shown in FIG. 4 which will be described later, for example, and a random number is generated in a range of the location Nos. 1 through 4 and one location No. is selected depending on the generated random number.

A step S22 notifies the location No. to the coordinate detecting microcomputer 4, so as to notify the start of the ID authentication process to the coordinate detecting microcomputer 4. As a result, the location No. selected depending on the random number in the step S21 is notified to the coordinate detecting microcomputer 4, and the ID authentication process of the coordinate detecting microcomputer 4 is started.

Figure 4:
FIG. 4 is a diagram showing a user ID input screen image in the present invention.

A step S23 displays a card frame corresponding to the location No. In other words, the card frame is displayed at the location No. selected by the random number in the step S1, that is, at the location No. 1 shown in FIG. 4, for example, so as to urge the user to align a card to the card frame and to input coordinates via holes or openings, cutouts or marks of the card.

A step S31 starts the ID authentication process of the coordinate detecting microcomputer 4 responsive to the step S22.

A step S32 sets as a comparison data a registered data corresponding to the specified location No. More particularly, a registered data corresponding to the specified location No. notified in the step S22 is obtained from the registered data shown in FIG. 5B which will be described later, and the obtained registered data is set as the comparison data.

A step S33 makes a coordinate check. When the card frame shown in FIG. 4 is displayed on the screen 11 of the touch panel or tablet in the step S23 and the user aligns the card to the card frame and pushes the positions of the holes or openings, cutouts or marks of the card by a pen or the like, the coordinate values of the pushed positions are detected, and a check is made to determine whether or not the detected coordinate values match the registered data obtained in the step S32.

A step S34 notifies a result of the authentication to the software of the CPU 1.

A step S24 decides whether or not the authentication is ended. This step S24 is repeated until the authentication result is obtained. When the authentication result is obtained from the step S34, the decision result in the step S24 becomes YES, and the process advances to a step S25.

The step S25 carries out a process according to the authentication result. For example, if the authentication result is acceptable, the operating system is loaded or the application is started in FIG. 2. On the other hand, if the authentication result is not acceptable, the loading of the operating system is not carried out and the application is not started in FIG. 2, and an error or the like is detected.

By the above described process, the location such as the location No. 1 shown in FIG. 4 is selected by a random number, and the card frame is displayed at the location No. 1 so as to urge the user to place the card in the displayed card frame. When the user places the card in the card frame and pushes the holes or openings, cutouts or marks of the card by the pen or the like, the coordinate values of the pushed positions are read. The read coordinate values are collated with registered data corresponding to the selected location No. It is possible to judge that the result of the authentication is acceptable if the compared values match, and to judge that the authentication is not acceptable if the compared values do not match.

In addition, according to the present invention, the coordinates are easily input by simply making the coordinate input by the pen, and the authentication is made using the input coordinates. For this reason, the present invention can provide an authentication technique suited for the operation of the pen input equipment, touch panel and the like, such as the portable pen input equipments shown in FIGS. 29 and 30 which will be described later. Particularly, in the case of the pen input equipment, touch panel and the like, such as the portable pen input equipments shown in FIGS. 29 and 30 which will be described later, a keyboard may not be provided, and even if the keyboard is provided, the user may not always use the keyboard. Under such usage of the equipment, it is possible to make an authentication suited for the manner in which the pen input equipment or the pen PC is used, and the authentication will not deteriorate the operation of the equipment.

FIG. 4 is a diagram showing a user ID input screen image in the present invention. In this user ID input screen image, a card frame 12 is selected by the random number and is displayed in correspondence with a message "PLACE CARD AND MAKE INPUT BY PEN", as shown in FIG. 4. Hence, the user places the card in the displayed card frame 12, and pushes the holes or openings, cutouts or marks of the card by the pen. The authentication apparatus reads the coordinate values input on the screen 11, and compares the input coordinate values and the registered data. Hence, it is possible to judge that the authentication is acceptable if the compared values match, and to judge that the authentication is not acceptable if the compared values do not match.

Figures 5A, 5B:
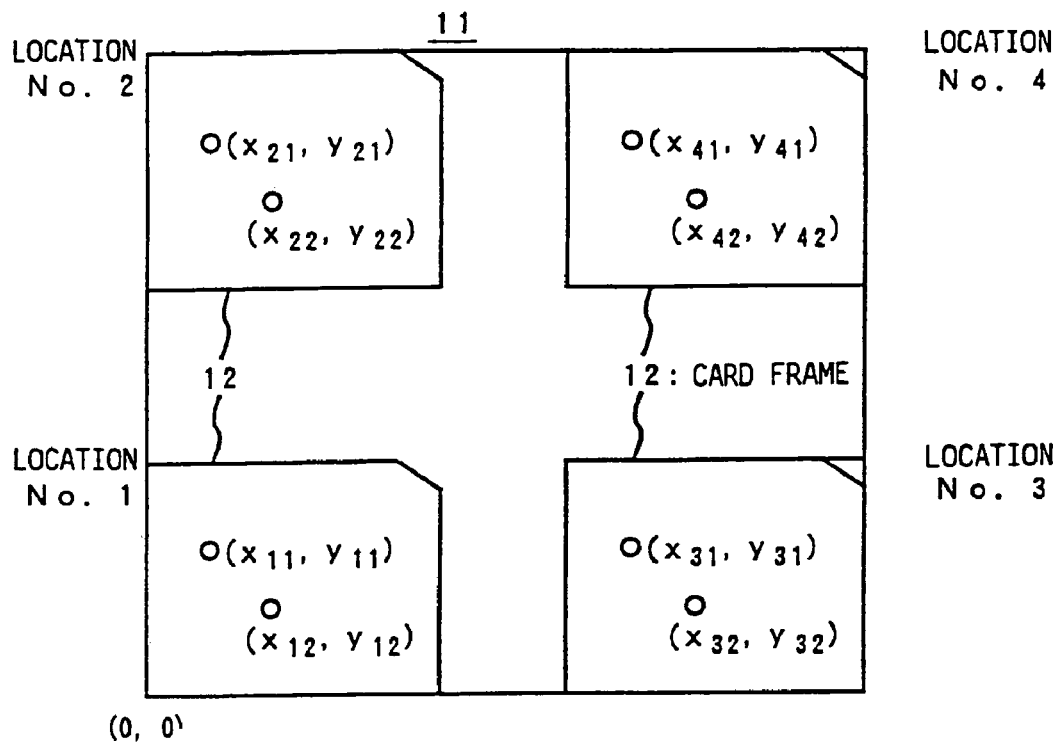
FIGS. 5A and 5B respectively are diagrams for explaining a case where the position where the card is placed can be changed.

FIGS. 5A and 5B respectively are diagrams for explaining a case where the position where the card is placed can be changed.

FIG. 5A shows a screen image of the touch panel. This touch panel may be formed by a display such as a CRT, liquid crystal display and plasma discharge panel, and a transparent digitizer or tablet (resistor layer) arranged on the display or, an electromagnetic induction type digitizer arranged below the display. In the case of the electromagnetic induction type, the coordinate detector which is arranged below the screen (for example, a liquid crystal display) detects the coordinate by sensing the magnetism of the pen (or stylus). The location Nos. 1 through 4 of the card frame 12 are determined to the 4 corners of the screen 11 as shown in FIG. 5A, and 2 points (point Nos. 1 and 2) are specified as reference coordinate values and registered with respect to each location No. as shown in FIG. 5B.

FIG. 5B shows the registered data for the case where the location Nos. 1 through 4 are determined to the 4 corners of the screen 11 as shown in FIG. 5A and the point Nos. 1 and 2 are specified as the reference coordinate values and registered with respect to each location No. For example, a coordinate $(x11, y11)$ is registered as the point No. 1 with respect to the location No. 1, and a coordinate $(x12, y12)$ is registered as the point No. 2 with respect to the location No. 1. The number of points registered with respect to each location No. may be determined arbitrarily.

Figures 6A, 6B:
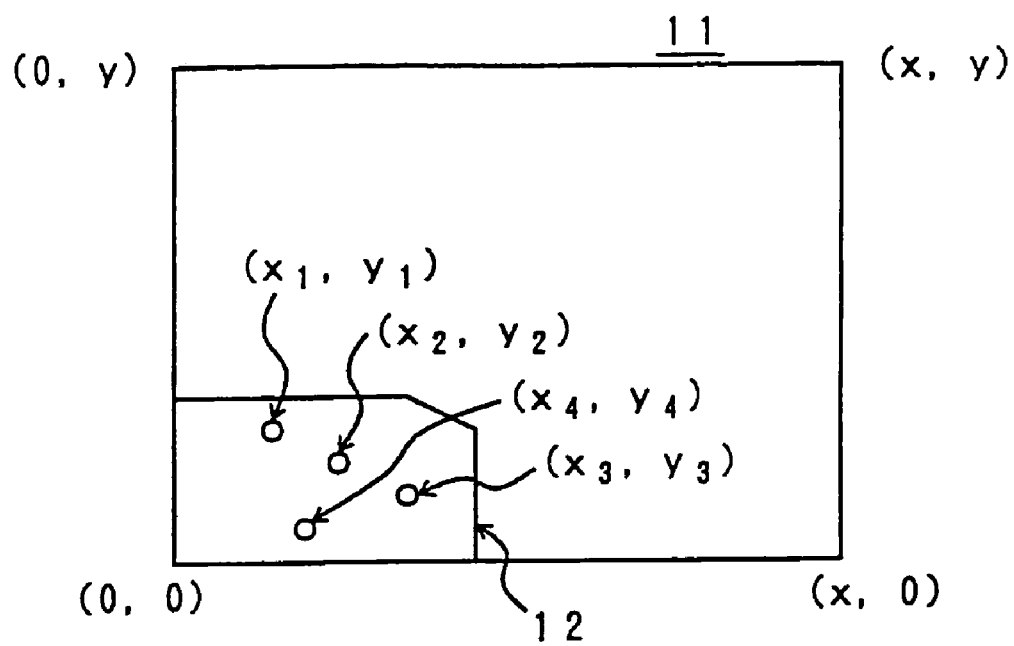
FIGS. 6A and 6B respectively are diagrams for explaining the structure of the registered data in the present invention.

Hence, the position where the card frame 12 is to be displayed on the screen 11 is determined by the random number to one of the location Nos. 1 through 4 at the 4 corners of the screen 11, and in addition, the coordinates of the point Nos. 1 and 2 are specified and registered with respect to each location No. As a result, when the card frame 12 is determined to one of the 4 locations by the random number and displayed on the screen 11, the card is placed in the displayed card frame 12 and the coordinates are input by pushing the holes or openings, cutouts or marks of the card at the point Nos. 1 and 2 by the pen, and it is judged that the authentication is acceptable if the input coordinates match the registered data. For this reason, it is possible to prevent the same location of the screen 11 from being damaged and guessed by a third party because the card is not always placed in the same location, and to prevent the location of the screen 11 where the card is to be placed from becoming known to a third party. FIGS. 6A and 6B respectively are diagrams for explaining the structure of the registered data in the present invention.

FIG. 6A shows an origin at a bottom left of the screen. In other words, FIG. 6A shows a case where the origin $(0, 0)$ is positioned at the bottom left of the screen 11 when the card frame 12 is displayed at one of the 4 corner locations of the screen 11 shown in FIG. 5A. In the case shown in FIG. 6A, the coordinates of the points 1 through 4 shown are specified and registered.

FIG. 6B shows the registered data for a case where the card frame 12 is displayed as shown in FIG.AA and the point 1 $(x1, y1)$, point 2 $(x2, y2)$, 5 point-3 $(x3, y3)$ and point 4 $(x4, y4)$ are specified and registered.

Therefore, the coordinates of the four points (1 through 4) are registered as the registered data with respect to the card frame 12, and the coordinates are 10 input by pushing the holes or openings, cutouts or marks of the card frame 12 displayed on the screen 11 of the touch panel at 4 points by the pen. It is judged that the authentication is acceptable if the input coordinates match the registered data of the points 1 through 4, and that the authentication is not acceptable if the input coordinates do not match the registered data.

Figure 7:
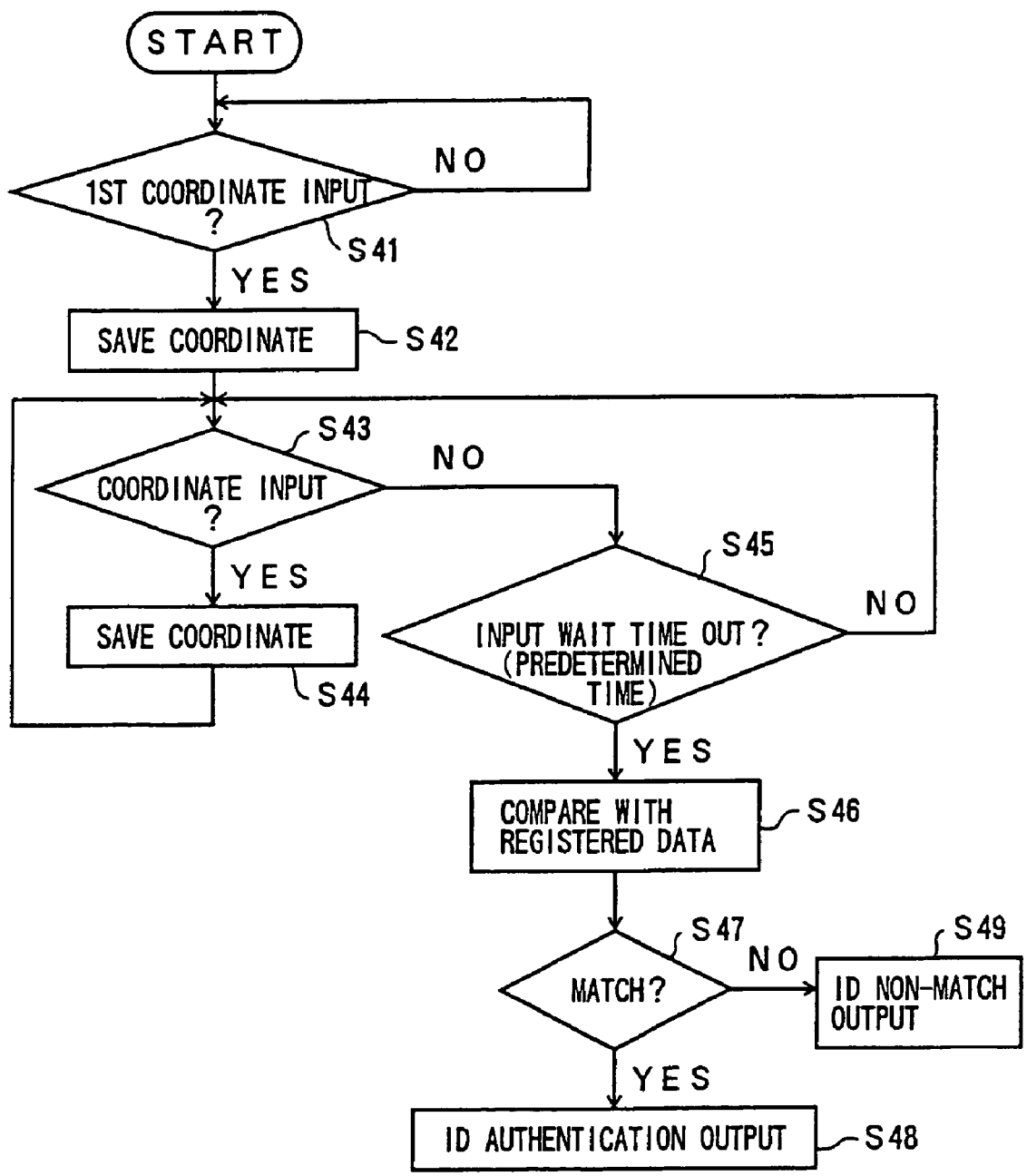
FIG. 7 is a flow chart for explaining the operation of the present invention carried out irrespective of an order of the input.

FIG. 7 is a flow chart for explaining the operation of the present invention carried out irrespective of an order of the input.

In FIG. 7, a step S41 decides whether or not a coordinate input is a first input. If the decision result in the step S41 is YES, a step S42 saves the input coordinate value. The step S41 is repeated to assume a wait state if the decision result in the step S41 is NO. No time out is provided with respect to the first input, and the start of the user's input is waited.

A step S43 decides whether or not a coordinate input exists. If the decision result in the step S43 is YES, a step S44 saves the input coordinate value, and the process returns to the step S43. On the other hand, the process advances to a step S45 if the decision result in the step S43 is NO.

The step S45 decides whether or not an input wait time out (lapse of a predetermined time) has occurred. If the decision result in the step S45 is YES, it is judged that the predetermined time has elapsed and the coordinate input has ended, and thus, the process advances to a step S46. On the other hand, if the decision result in the step S45 is NO, it is judged that the predetermined time has not elapsed and the coordinate input has not ended, and hence, the process returns to the step S43.

The step S46 compares the input coordinate values and the registered data because the decision result in the step S45 is YES and it is judged that the coordinate input has ended.

A step S47 decides whether or not the input coordinate values and the registered data match. If the decision result in the step S47 is YES, a step S48 makes an ID authentication output. On the other hand, if the decision result in the step S47 is NO, a step S49 makes an ID non-match output. The ID authentication output and the ID non-match output are notified to the CPU 1. For example, in the case of the ID non-match output notification, the CPU 1 may carry out a control to display the ID non-match in response to the ID non-match output, and a similar control may be carried out in the following description.

Therefore, after the card is placed in the card frame 12 on the screen 11 and the first coordinate is input by the pen, the coordinates are successively input, and it is judged that the coordinate input has ended when no coordinate input is made for the predetermined time. When it is judged that the coordinate input has ended, the input coordinate values and the registered data are compared, and the ID authentication output is made when the compared values match while the ID non-match output is made when the compared values do not match. As a result, it is possible to make an ID authentication having a high security by inputting the coordinate values by pushing by the pen the positions of the holes or openings, cutouts or marks of the card which is placed in the card frame 12 on the screen 11.

Figure 8:
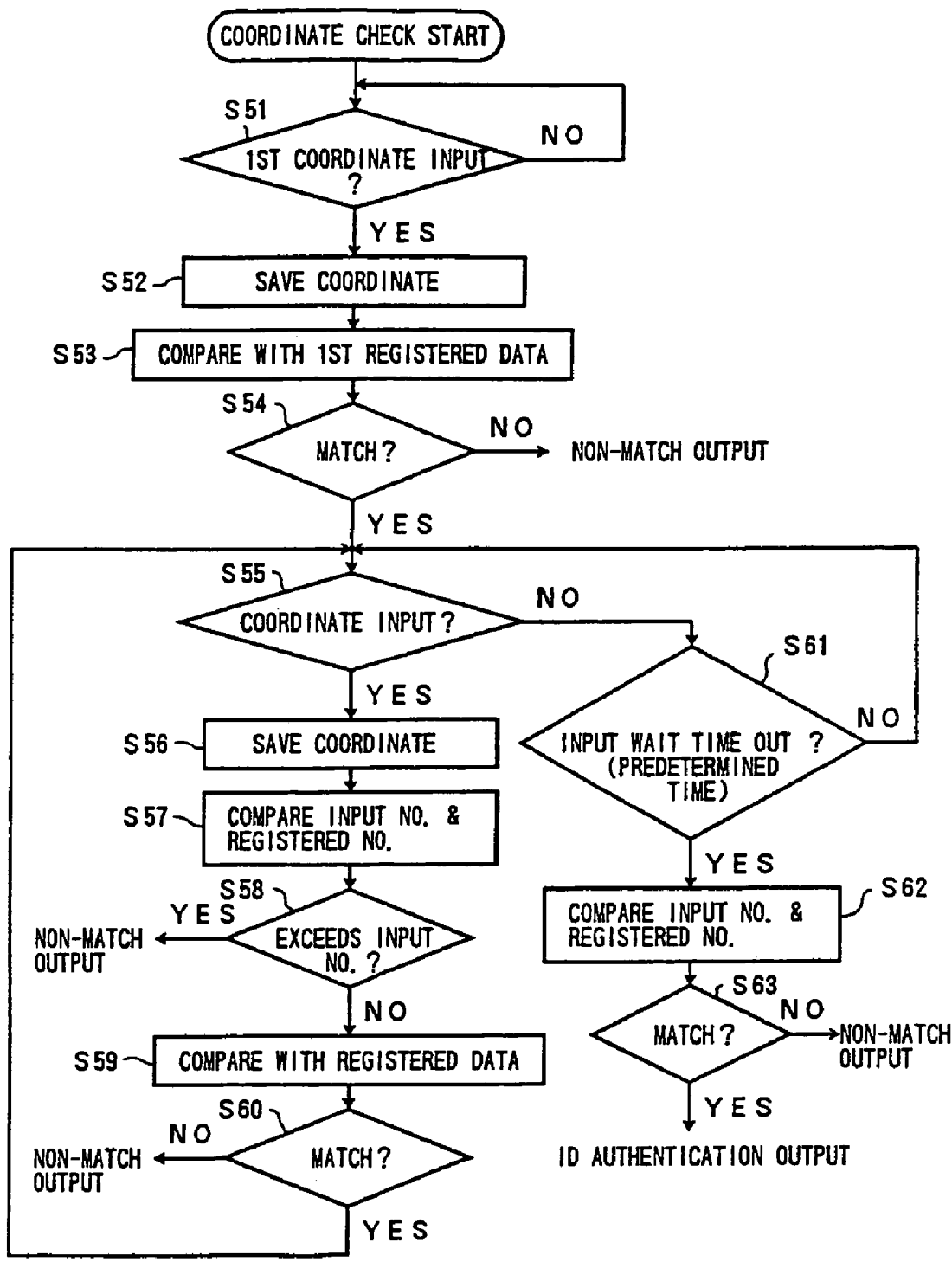
FIG. 8 is a flow chart for explaining the operation of the present invention carried out depending on an order of the input.

FIG. 8 is a flow chart for explaining the operation of the present invention carried out depending on an order of the input.

In FIG. 8, a step S51 decides whether or not a coordinate input is a first input. If the decision result in the step S51 is YES, a step S52 saves the input coordinate value. The step S51 is repeated to assume a wait state if the decision result in the step S51 is NO.

A step S53 compares the first input coordinate value and the first registered data.

A step S54 decides whether or not the compared values match. If the decision result in the step S54 is YES, it is judged that the compared values match, and the process advances to a step S55. On the other hand, if the decision result in the step S54 is NO, it is judged that the compared values do not match, and the process ends by making a non-match output.

The step S55 decides whether or not a coordinate input exists. If the decision result in the step S55 is YES, a step S56 saves the input coordinate value, and the process advances to a step S57. On the other hand, the process advances to a step S61 if the decision result in the step S55 is NO.

A step S57 compares the number of coordinate inputs made and the number of registered data.

A step S58 decides whether or not the number of coordinate inputs made exceeds the number of registered data. If the number of coordinate inputs made exceeds the number of registered data and the decision result in the step S58 is YES, a non-match output is made and the process ends. If the decision result in the step S58 is NO, the process advances to a step S59.

The step S59 compares the input coordinate values an the registered data.

A step S60 decides whether or not the input coordinate values and the registered data compared in the step S59 match. If the compared input coordinate values and the registered data match and the decision result in the step S60 is YES, the process returns to the step S55 and the next coordinate input is waited. If the compared input coordinate values and the registered data do not match and the decision result in the step S60 is NO, a non-match output is made and the process ends.

The step S61 decides whether or not an input wait time out (lapse of a predetermined time) has occurred, since the decision result in the step S55 is NO and it is judged that no coordinate input exists. If the decision result in the step S61 is YES, it is judged that the predetermined time has elapsed and the coordinate input has ended, and the process advances to a step S62. On the other hand, if the decision result in the step S61 is NO, it is judged that the predetermined time has not elapsed and the coordinate input has not ended, and the process returns to the step S55 to wait for the next coordinate input.

The step S62 compares the number of coordinate inputs made and the number of registered data.

A step S63 decides whether or not the input coordinate values and the registered data compared in the step S62 match. If the compared input coordinate values and the registered data match and the decision result in the step S63 is YES, an ID authentication output is made. If the compared input coordinate values and the registered data do not match and the decision result in the step S63 is NO, a non-match output is made.

Therefore, after the card is placed in the card frame 12 on the screen 11 and the first coordinate is input by the pen, the coordinates are successively input in a prescribed order, and the input coordinate values and the registered data are compared in an order. It is judged that the coordinate input has ended when no coordinate input is made for the predetermined time, and when it is judged that the coordinate input has ended, the input coordinate values and the registered data are successively compared. The ID authentication output is made when the compared values match and the number of coordinate inputs made and the number of registered data match, while the ID non-match output is made when the compared values do not match or the number of coordinate inputs and the number of registered data do not match. As a result, it is possible to make an ID authentication having a high security by successively inputting the coordinate values in the prescribed order by pushing by the pen the positions of the holes or openings, cutouts or marks of the card which is placed in the card frame 12 on the screen 11.

Figure 9:
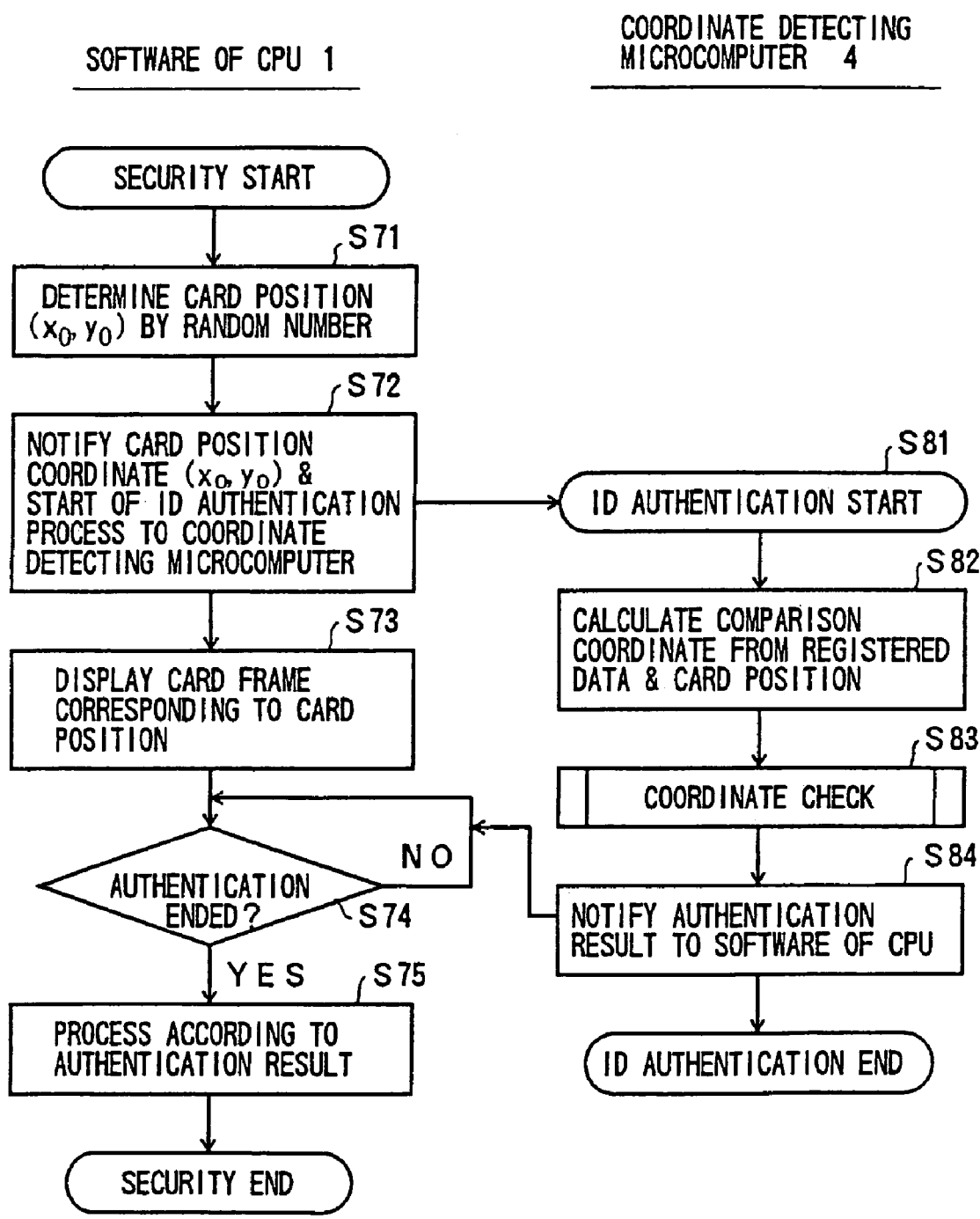
FIG. 9 is a flow chart for explaining a card position change in the present invention.

FIG. 9 is a flow chart for explaining a card position change in the present invention.

In FIG. 9, a step S71 determines a card position (x0, y0) by a random number.

A step S72 notifies the card position coordinate (x0, y0) to the coordinate detecting microcomputer 4, so as to notify the start of the ID authentication process to the coordinate detecting microcomputer 4.

A step S73 displays a card frame corresponding to the card position. Instead of the card frame, it is possible to display an arbitrary position marker which is capable of indicating a position where the card is to be placed.

A step S81 starts the ID authentication process of the coordinate detecting microcomputer 4 responsive to the notification of the step S72.

A step S82 calculates comparison coordinates from registered data and the card position coordinate. More particularly, the comparison coordinate values are calculated with respect to the registered data based on the card position coordinate (x0, y0) notified in the step S72.

A step S83 makes a coordinate check. When the card frame 12 shown in FIG. 10A which will be described later is displayed on the screen 11 in the step S73 and the user aligns the card to the card frame 12 and pushes the positions of the holes or openings, cutouts or marks of the card by a pen or the like, the coordinate values of the pushed positions are detected, and a check is made to determine whether or not the detected coordinate values match the comparison coordinate values calculated in the step S82.

A step S84 notifies a result of the authentication to the software of the CPU 1.

A step S74 decides whether or not the authentication is ended. This step S74 is repeated until the authentication result is obtained in the step S84. When the authentication result is obtained from the step S84, the decision result in the step S84 becomes YES, and the process advances to a step S75.

The step S75 carries out a process according to the authentication result. For example, if the authentication result is acceptable, the operating system is loaded or the application is started in FIG. 2. On the other hand, if the authentication result is not acceptable, the loading of the operating system is not carried out and the application is not started in FIG. 2, and an error or the like is detected.

By the above described process, the card position (x0, y0) is determined by a random number to the card position (x0, y0) shown in FIG. 10A, for example, and the card frame 12 is displayed at the card position (x0, y0) so as to urge the user to place the card in the displayed card frame 12. When the user places the card in the card frame 12 and pushes the holes or openings, cutouts or marks of the card by the pen or the like, the coordinate values of the pushed positions are read. The read coordinate values are collated with the comparison coordinate values calculated from the registered data and the card position (x0, y0). It is possible to judge that the result of the authentication is acceptable if the compared values match, and to judge that the authentication is not acceptable if the compared values do not match.

FIGS. 10A through 10C respectively are diagrams for explaining a data structure for a case where the software of the CPU 1 notifies the card position in the present invention.

FIG. 10A shows the card position on the screen of the touch panel. This card position (x0, y0) is arbitrarily determined by a random number. The card frame 12 is displayed as shown in FIG. 10A using the card position (x0, y0) as the origin. The card is placed in the displayed card frame 12, and the coordinates are input by pushing the positions of the holes or openings, cutouts or marks of the card by a pen.

FIG. 10B shows coordinates within the card. A bottom left of the card is regarded as the origin (0, 0), and the coordinates of 4 points are set as shown in FIG. 10B. The card frame 12 shown in FIG. 10A is arranged so that the origin (0, 0) of the card matches the origin (x0, y0) which is determined by the random number on the screen 11. Hence, the step S82 shown in FIG. 9 calculates the coordinates of the 4 points by adding the coordinate of the origin (x0, y0).

FIG. 10C shows the registered data, where the point Nos. 1 through 4 correspond to the 4 points specified within the card shown in FIG. 10B. The card origin (x0, y0) is the origin which is determined by the random number used to display the card frame 12 on the screen 11 in FIG. 10A. The coordinate values within the card correspond to the coordinates of the 4 points within the card shown in FIG. 10B. Comparison coordinate values are respectively calculated by adding to the coordinate values of the 4 points within the card shown in FIG. 10B the origin (x0, y0) which is determined by the random number on the screen 11 shown in FIG. 10A.

Accordingly, the card position (x0, y0) shown in FIG. 10A is determined by the random number and the card frame 12 is displayed as described above. In addition, the card position (x0, y0) is added to the coordinate values within the card, so as to obtain the coordinate values of the holes or openings, cutouts or marks of the card on the screen 11 as the comparison coordinate values. The authentication is judged as being acceptable if the coordinate values which are actually obtained match the comparison coordinate values, and the authentication is judged as not being acceptable if the coordinate values which are actually obtained do not match the comparison coordinate values.

Figure 11:
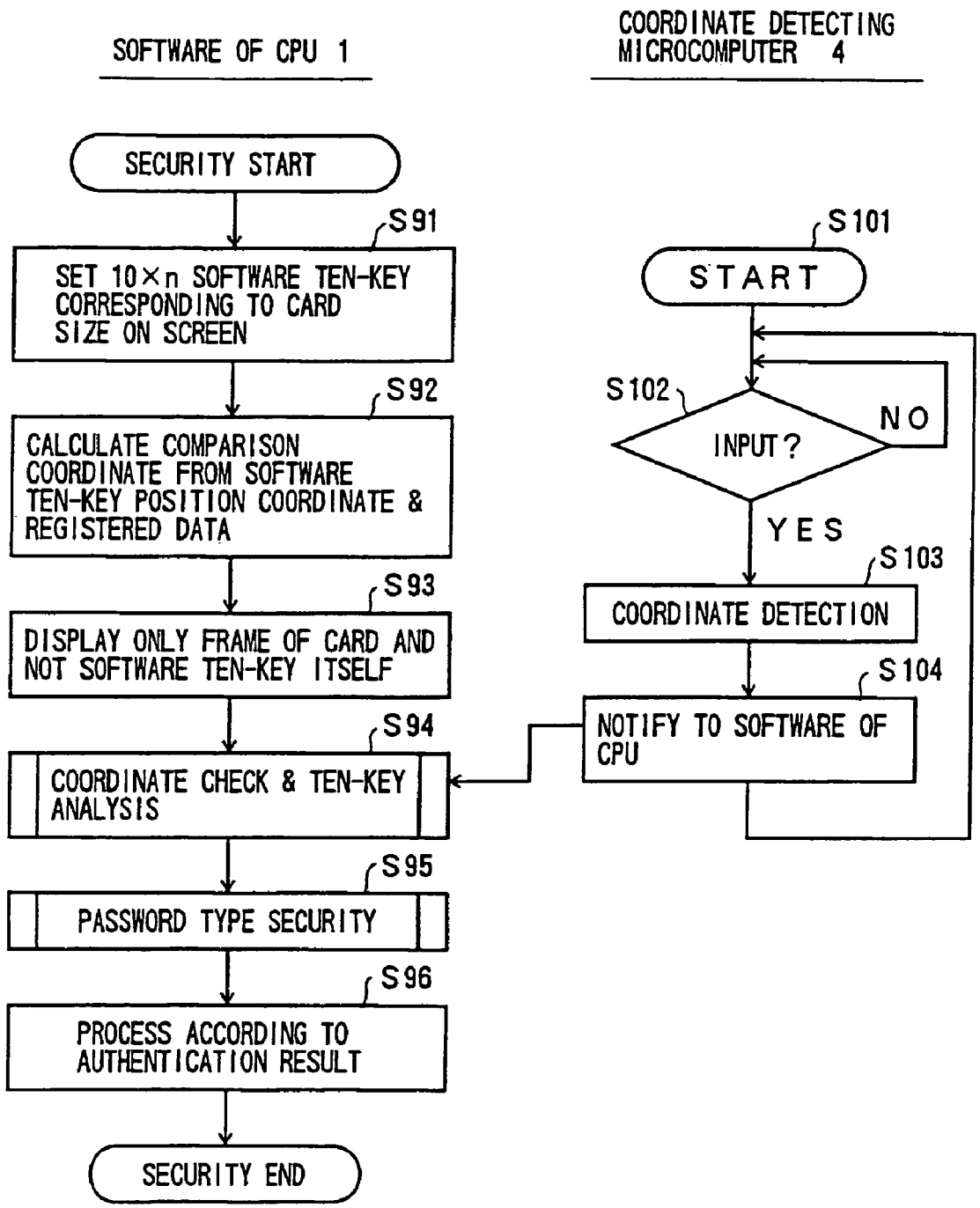
FIG. 11 is a flow chart for explaining a process using a software keyboard in the present invention.

FIG. 11 is a flow chart for explaining a process using a software keyboard (KB) in the present invention.

In FIG. 11, a step S91 sets on the screen 11 a 10xn software ten-key corresponding to the size of the card. More particularly, the software ten-key is made up of n rows of 10 keys "0" through "9" shown in FIG. 12B which will be described later, and this software ten-key is set at the origin (x0, y0) which is determined by the random number on the screen 11 shown in FIG. 12A.

A step S92 calculates comparison coordinates from the position coordinates of the software ten-key and the registered data. As described above, the origin (x0, y0) is added to the position coordinates of the software ten-key to calculate the coordinates on the screen 11 as the comparison coordinates.

A step S93 displays only the card frame, and the software ten-key itself is not displayed on the screen 11.

A step S101 notifies an input coordinate to the software of the CPU 1 if an input is made on the screen 11.

A step S102 decides whether or not the input exists. If the decision result in the step S102 is YES, a step S103 detects the input coordinate, and a step S104 notifies the input coordinate to the software of the CPU 1.

A step S94 makes a coordinate check and a ten-key analysis. More particularly, a check is made to determine the coordinate of the ten-key corresponding to the input coordinate notified in the step S104, and the coordinate of the ten-key is converted into a corresponding key of the ten-key.

A step S95 carries out a so-called password type security by discriminating whether or not the key converted from the coordinate of the ten-key in the step S104 matches the registered data with respect to the column of the numerical values (0, 1, 2, ..., 9) of the keys of the ten-key.

A step S96 carries out a process corresponding to a result of the authentication.

Therefore, by setting the frame of the software ten-key based on the origin (x0, y0) which is determined by the random number on the screen 11 and displaying only the frame of the ten-key, the ten-key itself is not displayed. The card described above is placed in the displayed frame of the software ten-key, and the coordinates are input by pushing the positions of the holes or openings, cutouts or marks of the card by the pen. The read coordinate values are converted into the keys of the software ten-key to determine which keys are pushed. By judging that the authentication is acceptable if the pushed keys match the registered data and that the authentication is not acceptable if the pushed keys do not match the registered data, it is possible to make the authentication based on a string of arbitrary numbers or the like successively input on the screen 11.

FIGS. 12A through 12D respectively are diagrams for explaining a data structure for a case where a card is placed on the software ten-key which is not displayed and a key code is notified in the present invention.

FIG. 12A shows a coordinate detection of the coordinate detecting microcomputer 4. The screen 11 shown in FIG. 12A displays an image of only the frame of the software ten-key with reference to the origin (x0, y0) which is determined by the random number. Inside this frame of the software ten-key, the coordinate values of 1 point per row and a total of 4 points in 4 rows are determined as shown in FIG. 12A.

FIG. 12B shows the coordinate-values of the software ten-key of the software of the CPU 1. In this case, 10 keys "0", "1", "2", . . . , "9" are provided in the software ten-key per row, and the coordinate values of the keys amounting to 4 rows are set as shown in FIG. 12B. In FIG. 12B, the bottom left corner is the origin (0, 0).

FIG. 12C shows the input coordinate values notified to the software of the CPU 1 from the coordinate detecting microcomputer 4. In this case, with respect to points 1, 2, 3 and 4, the coordinate values of the points 1, 2, 3 and 4 within the frame of the card shown in FIG. 12A are notified to the software of the CPU 1.

FIG. 12D is a diagram for explaining a comparison made by the software of the CPU 1. The point Nos. and the received coordinate values are the input coordinate values received from the coordinate detecting microcomputer 4 in FIG. 12C. The coordinate of the origin of the software ten-key is the origin (x0, y0) which is determined by the random number. Comparison coordinates of the software ten-key are obtained by subtracting the origin coordinate from each of the received coordinates for x and y, and converting subtracted results into the coordinates within the software ten-key. Comparison results are obtained by comparing the comparison coordinates of the software ten-key and the coordinate values within the software ten-key shown in FIG. 12B to determine whether or not matching coordinate values exist, and obtaining the matching coordinate values. A result is obtained by converting the coordinate values of the comparison results into numbers corresponding to the keys "0", "1", "2", . . . , "9". In the case shown in FIG. 12D, the result is "2692", and a corresponding key code is output.

Therefore, only the frame of the software ten-key is displayed with reference to the origin (x0, y0) which is determined by the random number on the screen 11, and the coordinates are input by placing the card within the displayed frame and pushing positions of the holes or openings, cutouts or marks of the card by the pen. The results are obtained by converting the input coordinates into the pushed keys of the software ten-key, and the key code corresponding to the results is output. The authentication is judged as being acceptable if a plurality of numbers corresponding to the output key code match the registered data, and the authentication is judged as not being acceptable if the plurality of numbers corresponding to the output key code do not match the registered data.

Figures 13A, 13B:
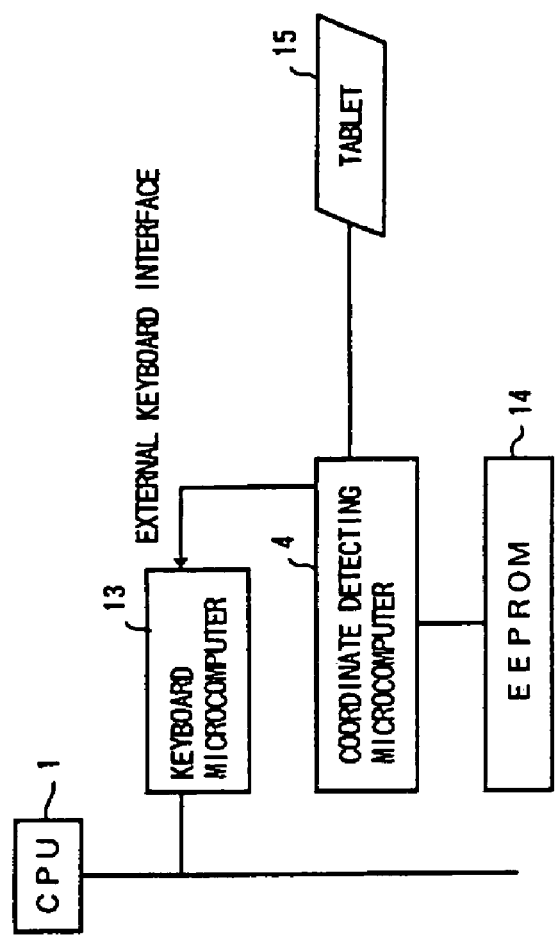
FIGS. 13A and 13B respectively are diagrams for explaining another data structure for a case where a card is placed on the software ten-key which is not displayed and a key code is notified in the present invention.

FIGS. 13A and 13B respectively are diagrams for explaining another data structure for a case where a card is placed on the software ten-key which is not displayed and a key code is notified in the present invention.

FIG. 13A shows data identical to the data shown in FIG. 12D described above. In the case shown in FIGS. 12A through 12D, the software ten-key is controlled by the software of the CPU 1, but in the case shown in FIGS. 13A and 13B, the software ten-key is controlled by the coordinate detecting microcomputer 4. For this reason, the software of the CPU 1 displays the card frame 12 on the screen 11 and notifies the origin (x0, y0) of the software ten-key determined by the random number to the coordinate detecting microcomputer 4. The coordinate detecting microcomputer 4 which receives this notification converts the key code of the results (for example, "2692" shown in FIG. 13A) obtained in the above described manner into a key code of an ordinary keyboard interface, and sends this key code to an external keyboard interface of a keyboard microcomputer 13 shown in a hardware block diagram of FIG. 13B. The keyboard microcomputer 13 thereafter notifies the key code to an input part of the software of the CPU 1 via the operating system.

FIG. 13B shows the hardware block diagram for the case where the control of the software ten-key carried out by the software of the CPU 1 in the case shown in FIGS. 12A through 12D is carried out by the coordinate detecting microcomputer 4 as described above. The keyboard microcomputer 13 is provided so as to transfer the data via the keyboard microcomputer 13 to the input part of the software of the CPU 1. A tablet 15 corresponds to one example of the coordinate detector 6 shown in FIG. 1.

Figure 14:
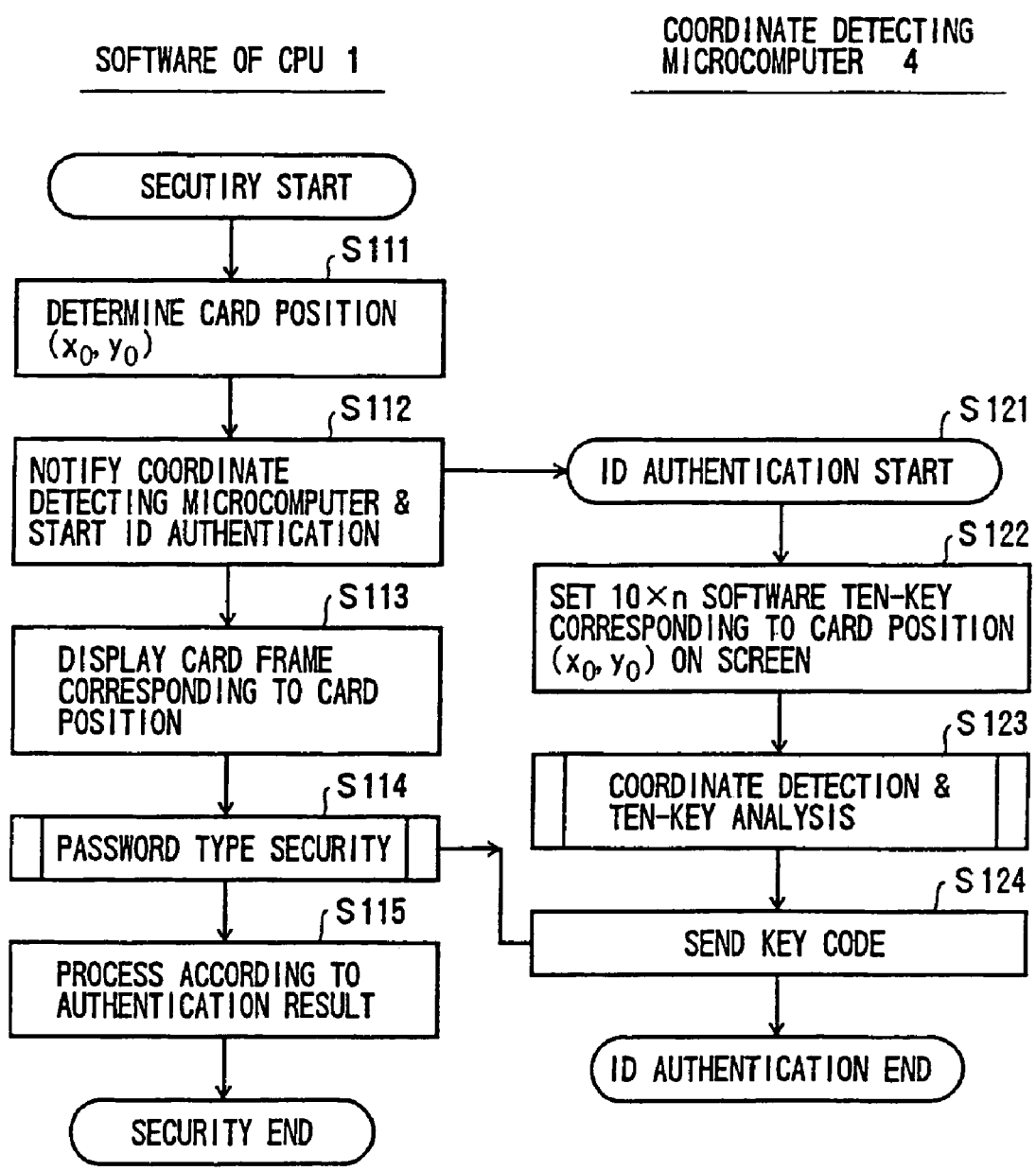
FIG. 14 shows a flow chart for explaining a process using a software keyboard in the present invention.

FIG. 14 shows a flow chart for explaining a process using a software keyboard in the present invention.

In FIG. 14, a step S111 determines a card position (x0, y0) by a random number.

A step S112 notifies the card position (x0, y0) to the coordinate detecting microcomputer 4 to start an ID authentication process.

A step S113 displays a card frame corresponding to the card position (x0, y0).

A step S121 starts the ID authentication process.

A step S122 sets on a screen a 10xn software ten-key corresponding to the card position (x0, y0).

A step S123 carries out a coordinate detection and a ten-key analysis. More particularly, when the card is placed within the card frame as described above and the positions of the holes or openings, cutouts or marks of the card are pushed by the pen as described above, the input coordinates are detected, and corresponding positions on the software ten-key are obtained from the input coordinates and are converted into corresponding numerical values (results).

A step S124 sends a key code by converting the numerical values (results) obtained in the step S123 into the key code.

A step S114 carries out a so-called password type security by discriminating whether or not the input coordinates converted into the positions on the software ten-key in the step S123 matches the registered data with respect to the column of the numerical values (0, 1, 2, . . . , 9) of the keys of the software ten-key.

A step S115 carries out a process corresponding to a result of the authentication.

Therefore, the frame of the software ten-key is set based on the origin (x0, y0) which is determined by the random number on the screen 11, and only the frame of the software ten-key is displayed and the software ten-key itself is not displayed. The coordinates are input by placing the card within the displayed frame and pushing positions of the holes or openings, cutouts or marks of the card by the pen. The input coordinates are converted into the pushed keys of the software ten-key. The authentication is judged as being acceptable if a plurality of numbers corresponding to the output key code match the registered data, and the authentication is judged as not being acceptable if the plurality of numbers corresponding to the output key code do not match the registered data.

In the description given above, the software ten-key has 10xn keys, but the software ten-key may of course have mxn keys arranged therein. In addition, a software keyboard having keys of an ordinary keyboard, such as alphabet keys, Japanese Kana character keys and symbol keys may be used in place of the software ten-key.

Figure 15A:
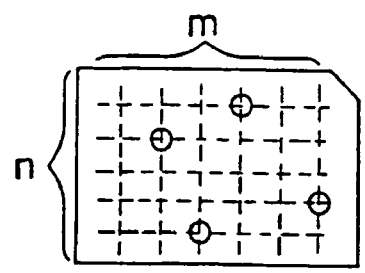
FIGS. 15A and 15B respectively are diagrams showing the structure of the card.
Figure 15B:
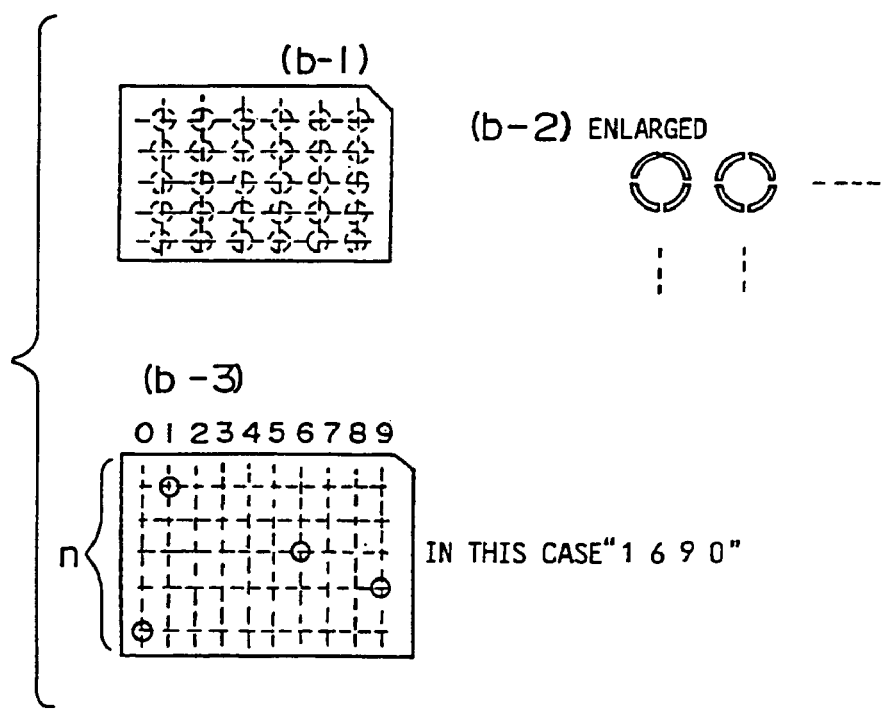

FIGS. 15A and 15B respectively are diagrams showing the structure of the card.

FIG. 15A shows a card having holes provided at arbitrary positions on a mxn grid. In this particular case, 4 holes are provided in the card and shipped together with the computer system. The coordinate values of the positions of the 4 holes in the card are registered in an internal table of the computer system as the registered data.

FIG. 15B shows a card having perforated parts at intersections of a mxn grid so that arbitrary perforated parts can be removed by punching to form holes.

In FIG. 15B, (b-1) shows the card having the perforated parts at the intersections of the mxn grid, where the perforated parts can be punched and removed with ease.

In FIG. 15B, (b-2) shows the intersection parts of the grid shown in (b-1) on an enlarged scale. As shown on the enlarged scale, the intersection part is punched out in a circular shape except for small portions, so that the entire intersection part can be punched out and removed to form a hole by pushing the intersection part by a pen or the like. Hence, the holes can be formed at arbitrary intersection parts of the card.

In FIG. 15B, (b-3) shows a case where an ID "1690" is set by punching out and removing the intersection parts to form the holes at the positions shown on the 10 columnxn row grid. Hence, the user can register in the computer system the ID of a unique card which is arbitrarily created by the user.

By providing the mxn grid on the card and forming the holes in the card at arbitrary coordinate positions, it is possible to input predetermined coordinate values by placing within the card frame 12 which is displayed on the screen 11 as described above and pushing the positions of the holes in the card.

Figure 16:
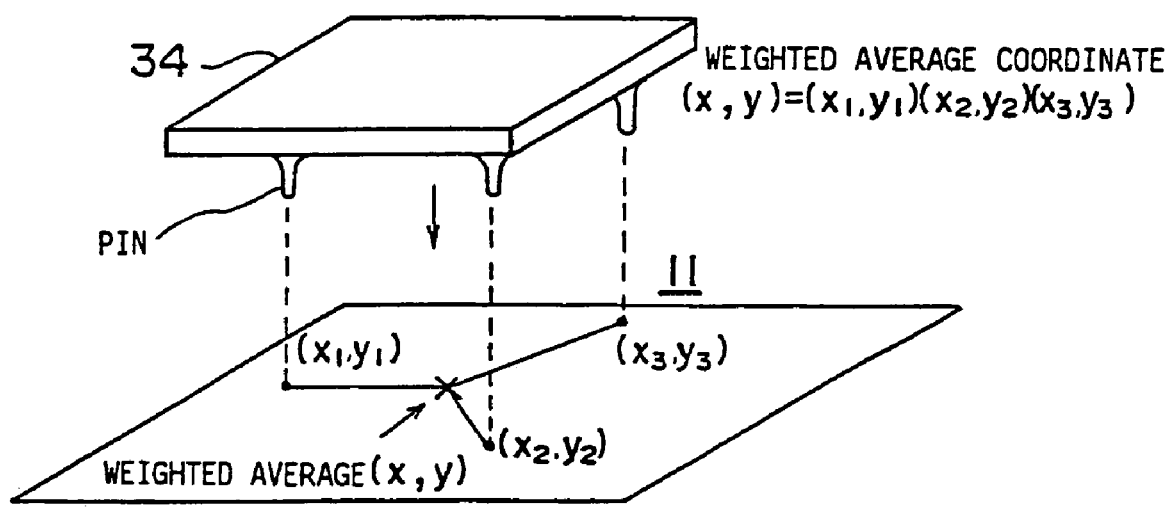
FIG. 16 is a diagram for describing a case where the resistor layer system is employed.
Figure 17:
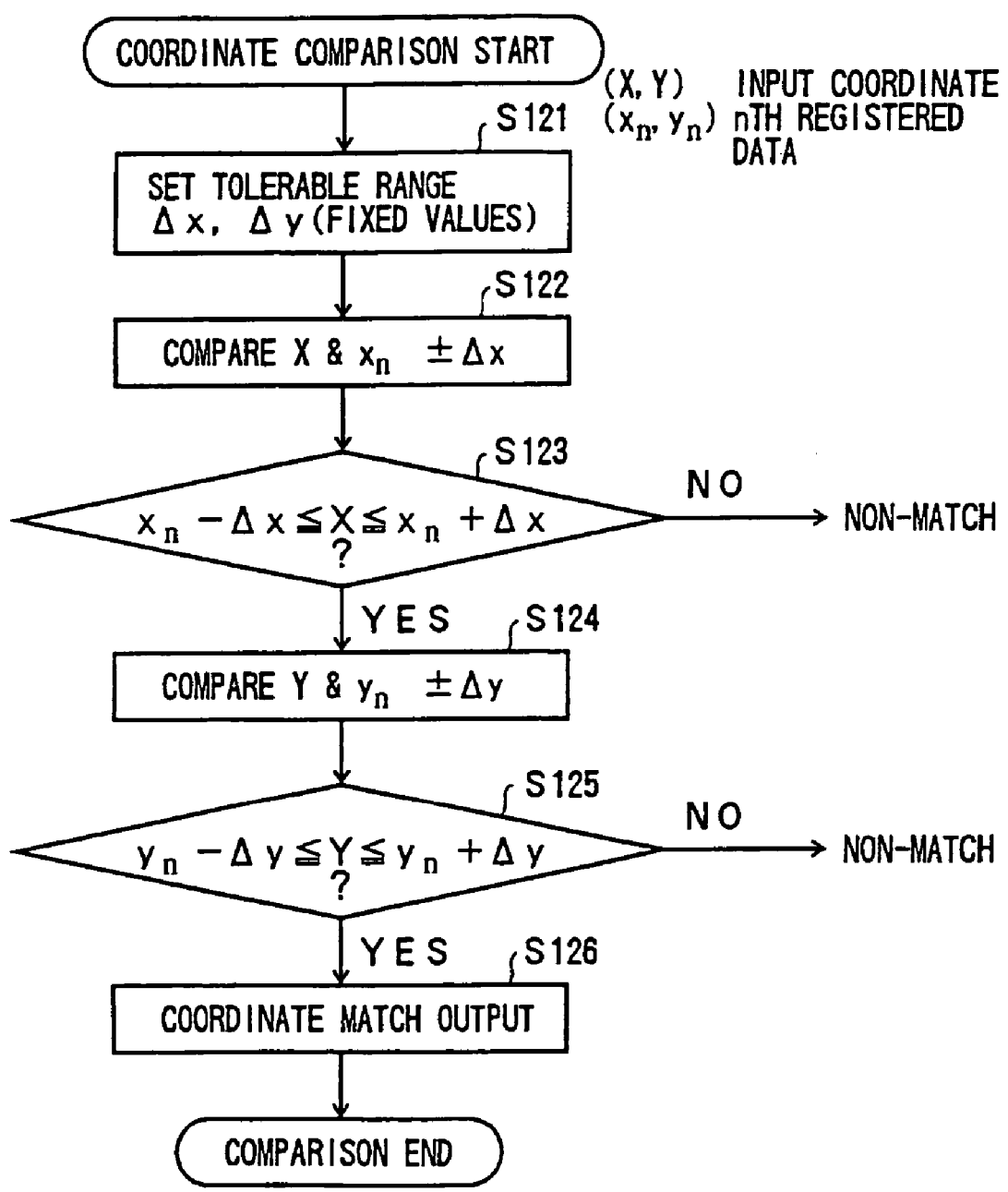
FIG. 17 is a flow chart for explaining a fixed value comparison in the present invention.

Next, a description will be given of a card having a shape other than that described above, by referring to FIG. 16. More particularly, a description ill be given of a case where the resistor layer system is employed and a plurality of projections are provided on the card as shown in FIG. 16. A transparent resistor layer is provided on the screen 11, and a card 34 having a plurality of pins is placed within the displayed card frame and pushed against the screen 11. In the case shown in FIG. 16, the resistor layer is pushed by 3 pins of the card 34, and a resistance corresponding to a weighted average coordinate of the 3 pushed points is detected as shown by a formula (x, y)=(x1, y1)(x2, y2)(x3, y3) shown in FIG. 16. For this reason, the positions of the plurality of pins of the card 34 are set in advance so that a desired weighted average coordinate is obtained, and it is possible to judge that the authentication is acceptable if the weighted average coordinate matches the registered data and to judge that the authentication is not acceptable if the weighted average coordinate does not match the registered data, FIG. 17 is a flow chart for explaining a fixed value comparison in the present invention. A detection error is included in the coordinate detected by the position detecting apparatus such as the coordinate detector. In addition, the manner in which the user pushes the screen by the pen also depends on the individual user. For this reason, it is always necessary to provide a tolerable range for the comparison of the detected coordinate and the registered coordinate.

In FIG. 17, a step S121 sets tolerable ranges $\Delta x$ and $\Delta y$. More particularly, a card is placed within the card frame 12 which is displayed on the screen 11, and the pen is used to input the coordinates, as described above. When detecting the input coordinates, the tolerable ranges $\Delta x$ and $\Delta y$ are set to fixed values.

A step S122 compares X and xn±$\Delta x$, where X denotes the X coordinate of the input coordinate (X, Y), and xn denotes the x coordinate of the nth registered data (xn, yn).

A step S123 decides whether or not xn−$\Delta x$≦X≦xn+$\Delta x$ by determining whether or not the X coordinate of the input coordinate (X, Y) falls within the tolerable range $\Delta x$ of the error set in the step S121. If the decision result in the step S123 is YES, the error is within the tolerable range $\Delta x$, and the process advances to a step S124. On the other hand, if the decision result in the step S123 is NO, the error is outside the tolerable range $\Delta x$, and thus, a non-match output is made and the process ends.

The step S124 compares Y and yn±$\Delta y$, similarly to the step S122, where Y denotes the Y coordinate of the input coordinate (X, Y), and yn denotes the y coordinate of the nth registered data (xn, yn).

A step S125 decides whether or not yn−$\Delta y$≦Y≦yn+$\Delta y$ by determining whether or not the Y coordinate of the input coordinate (X, Y) falls within the tolerable range $\Delta y$ of the error set in the step S124. If the decision result in the step S125 is YES, the error is within the tolerable range $\Delta y$, and the process advances to a step S126. The step S126 makes a coordinate match output, and the process ends. On the other hand, if the decision result in the step S125 is NO, the error is outside the tolerable range $\Delta y$, and thus, a non-match output is made and the process ends.

Therefore, the tolerable ranges $\Delta x$ and $\Delta y$ are set to fixed values, and the coordinate match is detected when the input coordinate (X, Y) detected on the screen 11 falls within the tolerable ranges $\Delta x$ and $\Delta y$ of the registered data. As a result, the coordinate match is correctly detected even if an error occurs to a certain extent when making the coordinate input, as long as the error is within the tolerable range.

Figures 18A, 18B:
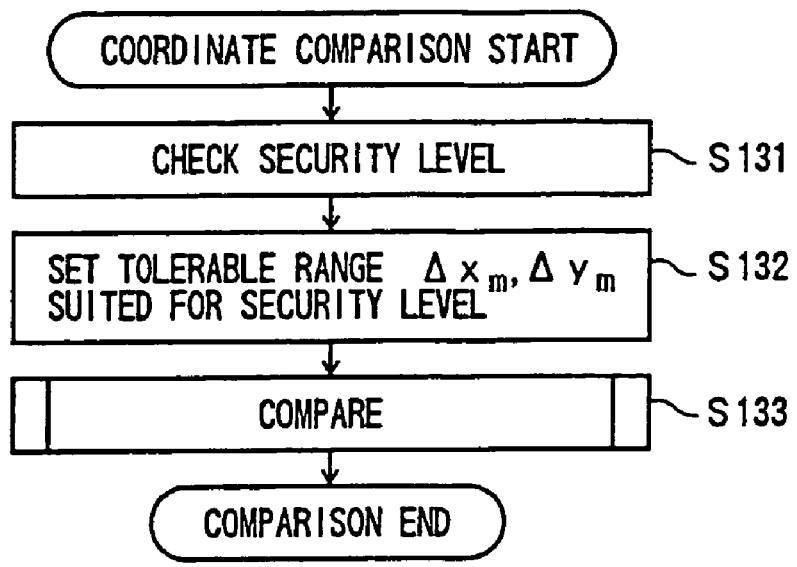
FIGS. 18A and 18B respectively are diagrams for explaining a process of setting a security level.

FIGS. 18A and 18B respectively are diagrams for explaining a process of setting a security level.

FIG. 18A is a flow chart showing the process.

In FIG. 18A, a step S131 checks the security level.

A step S132 sets tolerable ranges $\Delta xm$ and $\Delta ym$ suited for the security level. For example, the tolerable ranges $\Delta xm$ and $\Delta ym$ are set to small values when making the security level high, and the tolerable ranges $\Delta xm$ and $\Delta ym$ are set to large values when making the security level low.

A step S133 makes a comparison based on the flow chart described above in conjunction with FIG. 17, based on the tolerable ranges $\Delta xm$ and $\Delta ym$ which are set in the step S132 depending on the security level, so as to make a coordinate match output or a coordinate non-match output.

Therefore, by setting the tolerable ranges $\Delta x$ and $\Delta y$ small or large depending on whether the security level is high or low, it becomes possible to arbitrarily set strict or relaxed judging conditions for the comparison carried out with respect to the input coordinate.

In FIG. 18B, the judging conditions are most relaxed for a security level 1, and are most strict for a security level 1 (alphabet "1").

FIGS. 19A and 19B respectively are diagrams for explaining a process of setting a range of a relative coordinate in the present invention. With respect to the displayed card frame, the card position of the card placed by the user always includes a positioning error. This positioning error can be absorbed by setting a tolerable range with respect to the card origin coordinate (x0, y0).

FIG. 19A shows the data, where the point Nos. 1, 2, 3 and 4 indicate the points set within the card. The card origin is determined by the origin (x0, y0) on the screen 11 which displays the card frame and the tolerable range (Δx0, Δy0). The registration data of the hole coordinates within the card indicate the registered coordinates of the holes points on the card. A minimum min of the comparison coordinate range is obtained by subtracting the tolerable range (Δx0, Δy0) from the card origin (x0, y0) and adding the coordinate of each point to the subtracted result as shown in FIG. 19A. A maximum max of the comparison coordinate range is obtained by adding the tolerable range (Δx0, Δy0) to the card origin (x0, y0) and adding the coordinate of each point to the added result as shown in FIG. 19A.

FIG. 19B is a flow chart for the process of setting the range of the relative coordinate.

In FIG. 19B, a step S141 calculates a comparison coordinate min/max from the registered data, the card origin (x0, y0) and the tolerable range (Δx0, Δy0). That is, as described above in conjunction with FIG. 19A, the comparison coordinate min/max is calculated based on the registered data of the holes in the card, the card origin (x0, y0) and the tolerable range (Δx0, Δy0).

A step S142 makes a coordinate check. In other words, the card is placed within the card frame displayed on the screen 11, and the coordinates are input by pushing the positions of the holes or openings, cutouts or marks of the card. Then, the authentication is judged as being acceptable if the input coordinates fall within the range of the comparison coordinates min and max, and the authentication is judged as not being acceptable if the input coordinates do not fall within the range of the comparison coordinates min and max.

A step S143 notifies a result of the authentication to the software of the CPU 1.

Therefore, the range of the comparison coordinate min/max is calculated based on the registered data within the card, the card origin and the tolerable range, and a discrimination is made to determine whether or not the input coordinate fall within the range of the comparison coordinates min and max when the card is placed within the card frame displayed on the screen 11 and the coordinates are input by pushing the positions of the holes or openings, cutouts or marks of the card. It is thus possible to judge that the authentication is acceptable if the input coordinates fall within the range of the comparison coordinates min and max, and that the authentication is not acceptable if the input coordinates do not fall within the range of the comparison coordinates min and max.

Figure 20:
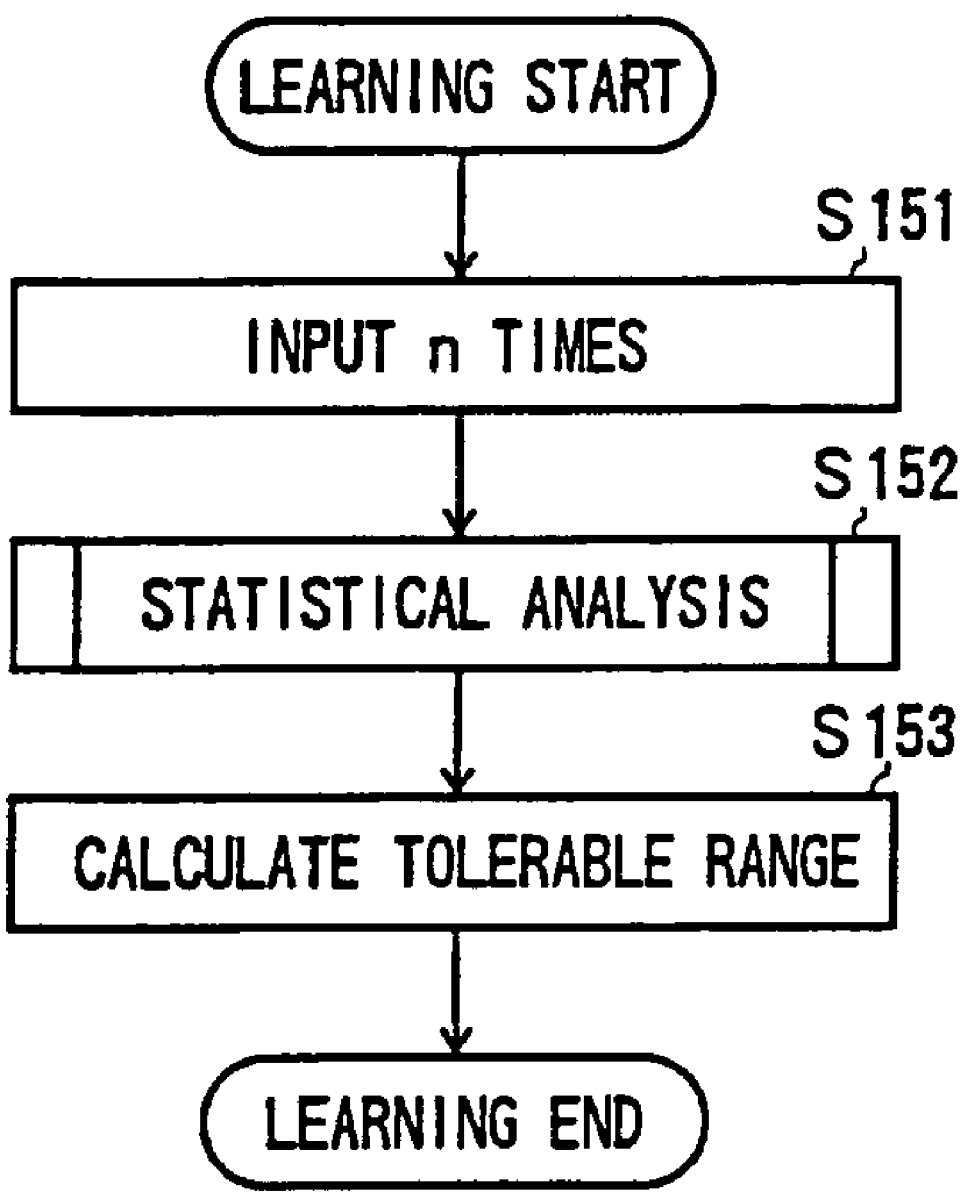
FIG. 20 is a flow chart for explaining a process of learning the tolerable range in the present invention.

FIG. 20 is a flow chart for explaining a process of learning the tolerable range in the present invention.

In FIG. 20, a step S151 makes an input n times. In other words, the card is placed within the card frame displayed on the screen 11, and the operation of inputting the coordinate by pushing the position of the hole or opening, cutout or mark of the card is repeated n times.

A step S152 makes a statistical analysis.

A step S153 calculates the tolerable range (Δx, Δy). These steps S152 and S153 obtains an average value, for example, based on a statistical analysis of the n coordinate values input in the step S151, and calculates as the tolerable range a neighboring range of the average value from the registered data.

Therefore, when the card is placed within the card frame 18 which is displayed on the screen 11 and the coordinates are input by pushing the positions of the holes or openings, cutouts or marks of the card by the pen, an average value of the input coordinates is obtained, and the tolerable range value from the registered data. Hence, even if the point where the coordinate input is made deviates depending on the habit of each individual user, it is possible to obtain the tolerable range in advance for each user, and the security level can be set high by setting the tolerable range narrow.

Figure 21:
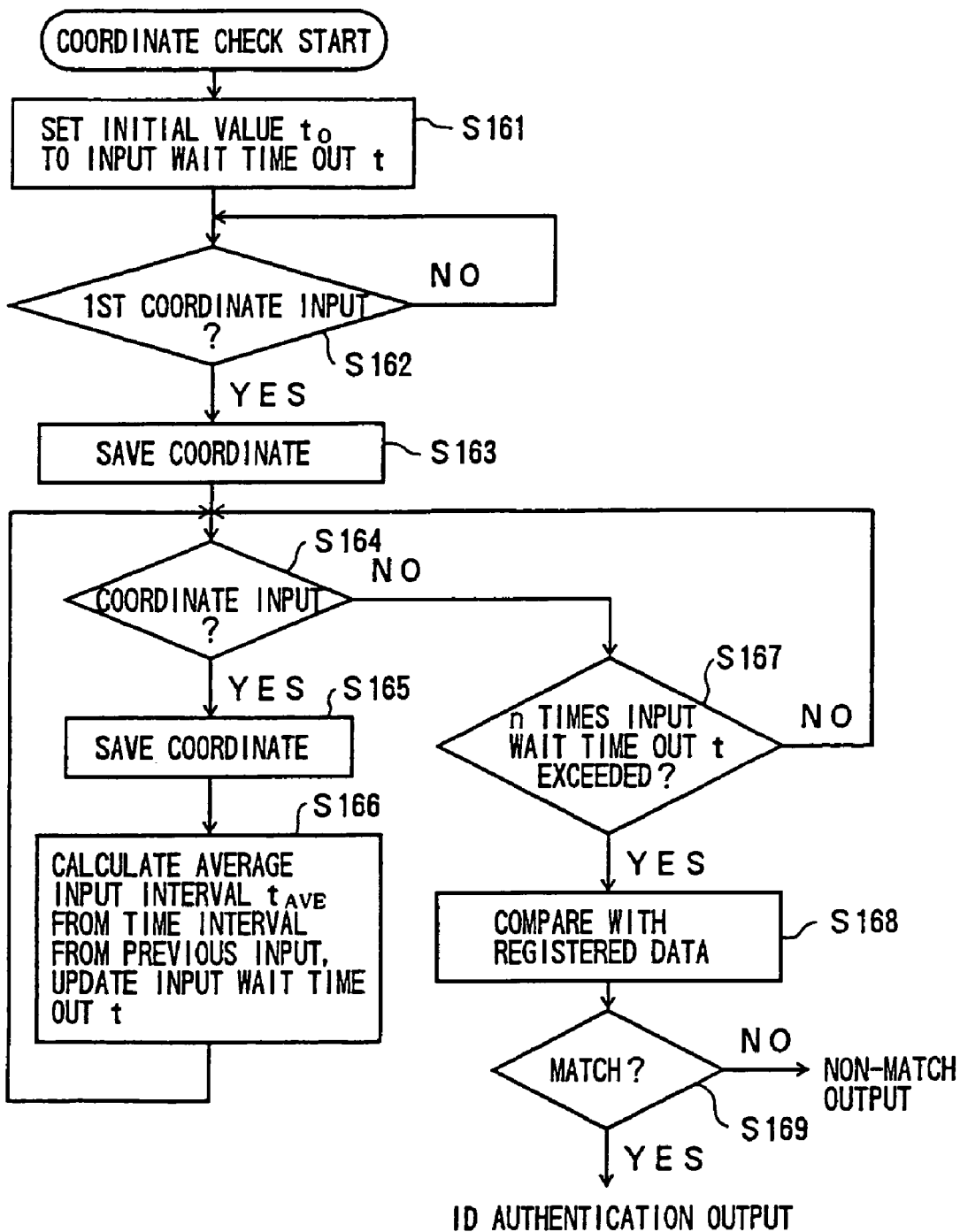
FIG. 21 is a flow chart for explaining the detection end operation which is independent of the order.

FIG. 21 is a flow chart for explaining the detection end operation which is independent of the order. The user himself can input his ID in a series of operations without hesitation. Hence, instead of detecting the end by a time out of a fixed value, it is possible to obtain an average time it takes for the user to input his ID, and to detect the end when the time in which no input is made during the input operation becomes long compared to the input time or input speed up to then. It is possible to improve the security with which the user himself is confirmed.

In FIG. 21, a step S161 sets an initial value t0 to an input wait time out t.

A step S162 decides whether or not a coordinate input is a first input. If the decision result in the step S162 is YES, a step S163 saves (stores) the input coordinate, and the process advances to a step S164. If the decision result in the step S162 is NO, the process returns to the step S162 to assume a wait state.

The step S164 decides whether or not a coordinate input is made. If the decision result in the step S164 is YES, a step S165 saves the input coordinate, and a step S166 calculates an average input interval $t_{AVE}$ from a time interval from the previous input and updates the input wait time out t. As a result, the input wait time out t is updated to the average input interval $t_{AVE}$. The process returns to the step S164 to repeat the above described process after the step S166. On the other hand, if the decision result in the step S164 is NO, the process advances to a step S167.

The step S167 decides whether or not n times the input wait time out t is exceeded. If the decision result in the step S167 is YES, it is judged that the present wait time has exceeded n times the input wait time out t. Hence, in this case, it is judged that the coordinate input has ended, and a step S168 compares the input coordinates and the registered data. On the other hand, if the decision result in the step S167 is NO, the process returns to the step S164 to wait for the coordinate input.

A step S169 decides whether or not the input coordinates and the registered data match. An ID authentication output is made if the decision result in the step S169 is YES. But if the decision result in the step S169 is NO, a non-match output is made.

Therefore, an average value of the intervals of the coordinate inputs is obtained, and the end of the coordinate input is detected when no coordinate input is made for a time interval greater than or equal to n times the obtained average value. Then, the input coordinates and the registered data are compared, and it is judged that the authentication is acceptable if the compared data match while it is judged that the authentication is not acceptable if the compared data do not match.

Figure 22:
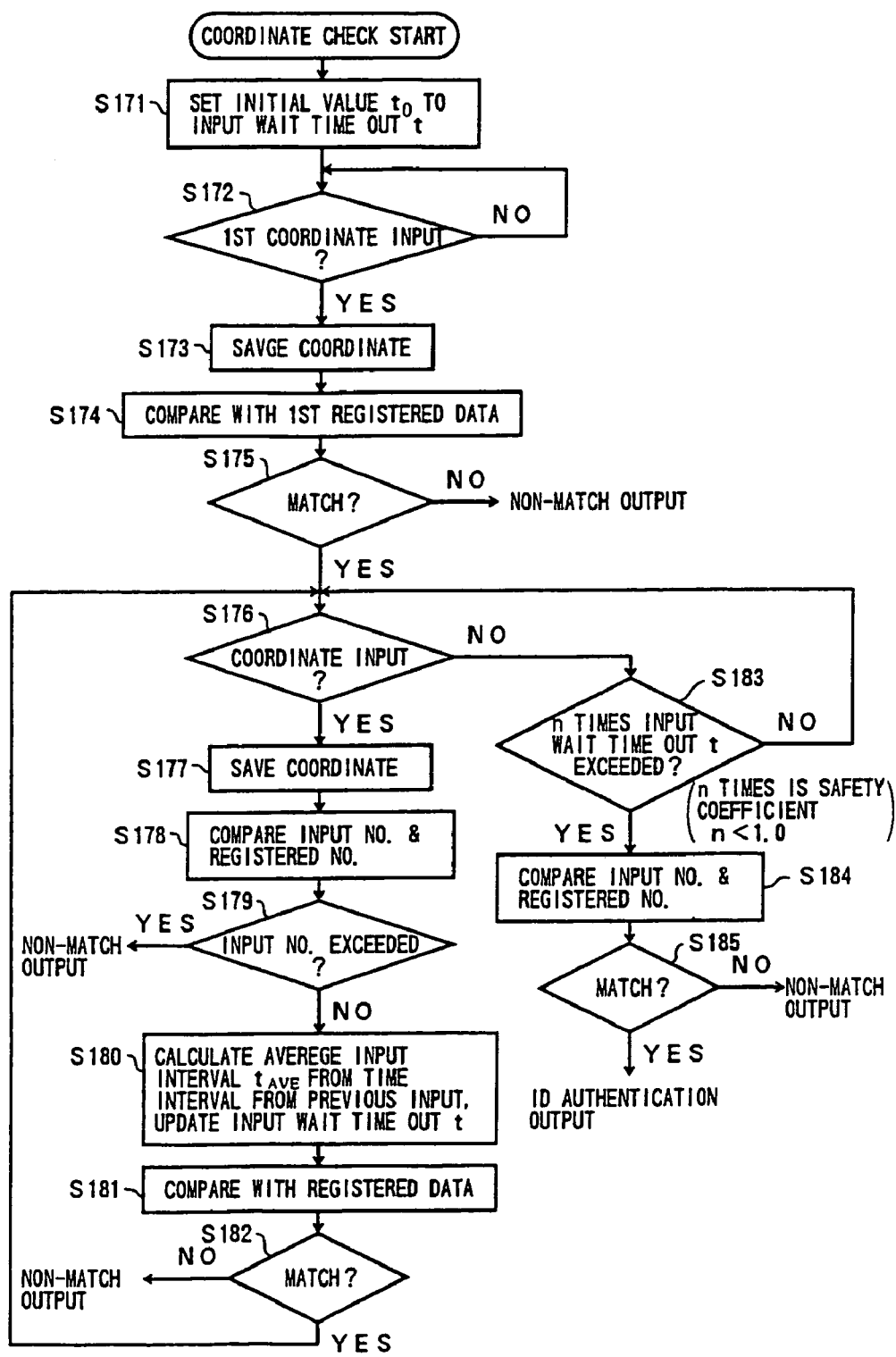
FIG. 22 is a flow chart is a flow chart for explaining the detection end operation which is dependent on the order.

FIG. 22 is a flow chart is a flow chart for explaining the detection end operation which is dependent on the order.

In FIG. 22, a step S171 sets an initial value t0 to an input wait time out t.

A step S172 decides whether or not a coordinate input is a first input. If the decision result in the step S172 is NO, the process returns to the step S172 to assume a wait state.

If the decision result in the step S172 is YES, a step S173 saves (stores) the input coordinate.

A step S174 compares the input data of the first coordinate input and the registered data, by comparing the coordinate input saved in the step S173 and the registered data.

A step S175 decides whether or not the saved coordinate input matches the registered data. If the decision result in the step S175 is YES, the process advances to a step S176. On the other hand, if the decision result in the step S175 is NO, a non-match output is made and the process ends.

A step S176 decides whether or not a coordinate input is made. If the decision result in the step S176 is YES, the process advances to a step S177. On the other hand, the process advances to a step S183 if the decision result in the step S176 is NO.

The step S177 saves the input coordinate since it is detected in the step S176 that the coordinate input is made.

A step S178 compares a number of inputs and a number of registered data or a number of registrations.

A step S179 decides whether or not the number of inputs exceeds the number of registered data. If the decision result in the step S179 is YES, a non-match output is made and the process ends. On the other hand, the process advances to a step S180 if the decision result in the step S179 is NO.

A step S180 calculates an average input interval $t_{AVE}$ from a time interval from the previous input and updates the input wait time out t. As a result, the input wait time out t is updated to the average input interval $t_{AVE}$.

A step S181 compares the coordinate input and the registered data.

A step S182 decides whether or not the coordinate input and the registered data compared in the step S181 match. The process returns to the step S176 to assume a wait state if the decision result in the step S182 is YES. On the other hand, if the decision result in the step S182 is NO, a non-match output is made and the process ends.

The step S183 decides whether or not n times the input wait time out t is exceeded. If the decision result in the step S183 is YES, it is judged that the present wait time has exceeded n times the input wait time out t. Hence, in this case, it is judged that the coordinate input has ended, and the process advances to a step S184. On the other hand, if the decision result in the step S183 is NO, the process returns to the step S176 to wait for the coordinate input.

The step S184 compares the number of inputs and the number of registered data.

A step S185 decides whether or not the number of inputs and the number of registered data match. An ID authentication output is made and the process ends if the decision result in the step S185 is YES. But if the decision result in the step S185 is NO, a non-match output is made and the process ends.

Therefore, an average value of the intervals of the coordinate inputs is obtained, and the end of the coordinate input is detected when no coordinate input is made for a time interval greater than or equal to n times the obtained average value. Then, the input coordinates and the registered data are compared for the number of registered data or the number of registrations, and it is judged that the authentication is acceptable if the compared data match while it is judged that the authentication is not acceptable if the compared data do not match.

Next, a detailed description will be given of the operation of pushing the positions of the holes or openings, cutouts or marks of the card 34 which is placed on the coordinate detector 6 such as the tablet by use of the pen, by referring to a flow chart shown in FIG. 23, with respect to a case where the frame of the card 34 is not displayed on the coordinate detector 6 as shown in FIG. 24A.

Figure 23:
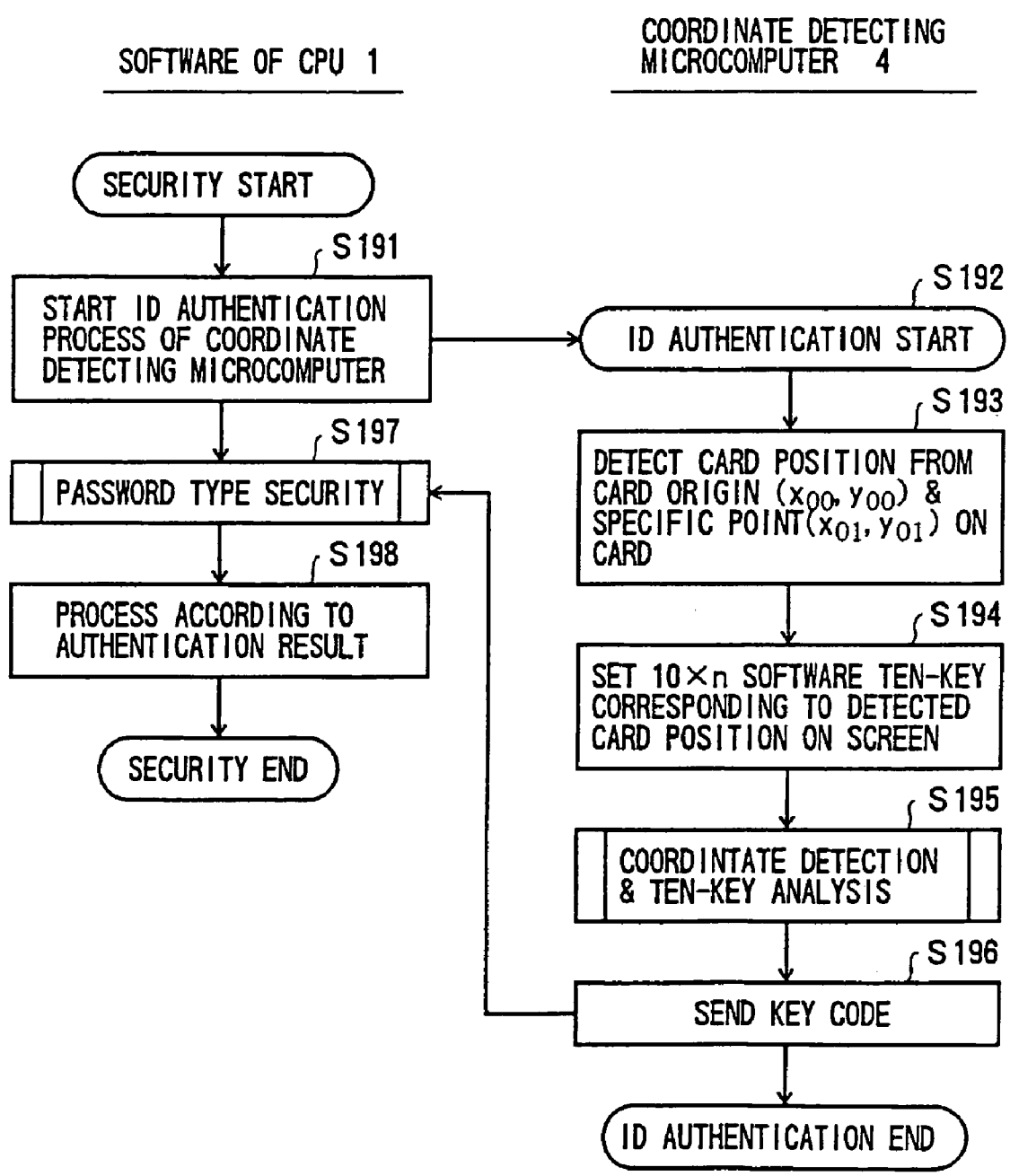
FIG. 23 is a flow chart showing the operation of placing the card at an arbitrary position on he tablet.

FIG. 23 is a flow chart showing the operation of placing the card at an arbitrary position on the tablet, the touch panel or the like.

In FIG. 23, a step S191 starts an ID authentication process of the coordinate detecting microcomputer 4 by the software of the CPU 1.

A step S192 the ID authentication process is started by the coordinate detecting microcomputer 4.

A step S193 detects a card position from a card origin (z00, y00) and another specific point (x01, y01) on the card. As will be described later in conjunction with FIG. 24A, for example, a bottom left coordinate (x00, y00) of the card 34 is pushed first by the pen on the tablet 21 and is detected as the card origin (x00, y00), and a bottom right coordinate (x01, y01) of the card 34 is pushed second by the pen and is detected as the other specific point (x01, y01).

A step S194 sets on the screen a 10xn software ten-key corresponding to the detected card position. The software ten-key is set virtually on the screen, and the frame of the card is not displayed.

A step S195 detects the coordinates and analyzes the ten-key input. More particularly, the input coordinates are detected when the positions of the holes or openings, cutouts or marks of the card 34 are pushed by the pen, and the detected input coordinates are converted into numerical values (results) of the ten-key corresponding to the positions on the software ten-key.

A step S196 sends a key code by converting the numerical values (results) obtained in the step S195 into the key code.

A step S197 carries out a so-called password type security, by discriminating whether or not the key converted from the coordinate of the ten-key in the step S195 matches the registered data with respect to the column of the numerical values (0, 1, 2, . . . , 9) of the keys of the ten-key.

A step S198 carries out a process corresponding to the authentication result.

Therefore, the orgin (x00, y00) and another specific point (x01, y01) are input on the coordinate input apparatus such as the tablet and the touch panel, so as to virtually set the software ten-key. Both the frame of the ten-key and the ten-key itself are not displayed. The card 34 is placed on the coordinate input apparatus, and the coordinates are input by pushing the positions of the hole or openings, cutouts or marks of the card 34 by the pen. The read input coordinates are converted into the numerical values indicating which keys of the ten-key have been pushed, and are compared with the registered data. It is judged that the authentication is acceptable if the compared data match, and that the authentication is not acceptable if the compared data do not match. As a result, it is possible to make the authentication by inputting a string of arbitrary numbers or the like from the tablet which cannot display the card frame or the like.

Of course, the authentication method using the software ten-key in accordance with the flow chart shown in FIG. 23 may be replaced by another method such as that described above.

FIGS. 24A and 24B respectively are diagrams for explaining the data structure for a case where the card position may be an arbitrary position on the tablet, touch panel or the like in the present invention.

FIG. 24A shows an image of the coordinate input on the tablet, touch panel or the like. The card 34 is placed on the tablet 21, and the holes or openings, cutouts or marks of the card 34 are successively pushed by the pen at the bottom left and the bottom right of the card 34, 50 as to input the origin (x00, y00) and the other specific point (x01, y01). The position of the card 34 is determined from the coordinate values and the inclination of the origin (x00, y00) and the other specific point (x01, y01). Then, the positions of the holes or openings, cutouts or marks at 4 points on the card 34 are successively pushed by the pen, so as to input the coordinates (x0, y0), (x1, y1), (x2, y2) and (x3, y3).

FIG. 24B shows the registered data.

In FIG. 24B, the point Nos. indicate the numbers sequentially assigned to the coordinates which are input by pushing the positions of the holes or openings, cutouts or marks of the card 34 in FIG. 24A. In this particular case, there are 4 point Nos. 1 through 4.

The detected coordinates are the coordinates (x1, y1), (x2, y2), (x3, y3) and (x4, y4) which are detected at the point Nos. 1 through 4.

The card position detection coordinates are obtained as shown based on the coordinate values of the card origin (x00, y00) at the bottom left corner of the card 34 and the other specific point (x01, y01), and inclinations sin Δθ and cos Δθ and a distance $1_0$ between the positioning holes or the like are obtained. The software ten-key comparison coordinates are obtained by converting the coordinates (x1, y1), (x2, y2), (x3, y3) and (x4, y4) at the 4 point Nos. 1 through 4 into coordinate values (x1', y1'), (x2', y2'), (x3', y3') and (x4', y4') on the software ten-key based on the card position detection coordinates using the formulas shown in FIG. 24B.

The comparison results indicate the coordinates on the software ten-key to which the software ten-key comparison coordinates (x1', y1'), (x2', y2'), (x3', y3') and (x4', y4') belong. For example, in the case of a value (x12, y12), the affix "12" indicates a key having a numerical value "2" which is located at a second position of the first row out of the 4 rows of ten-keys each having keys having the numerical values "1", "2", "3", "4", "5", "6", "7", "8", "9" and "0".

The numerical value represent the comparison results by the numerical values. In this case, the numerical values are "2692".

Therefore, the card 34 is placed at an arbitrary position on the tablet 31, the touch panel or the like, and the position of the hole or opening, cutout or mark of the card 34 is pushed first by the pen to specify the card origin (x00, y00), and the position of the hole or opening, cutout or mark of the card 34 is pushed second by the pen to specify the other specific point (x01, y01), so as to set the software ten-key in a virtual manner within the computer system. Then, when the positions of the holes or openings, cutouts or marks of the card 34 at the point Nos. 1 through 4 are successively pushed third through sixth by the pan, the result is output as the numerical values "2692", for example.

Figure 25:
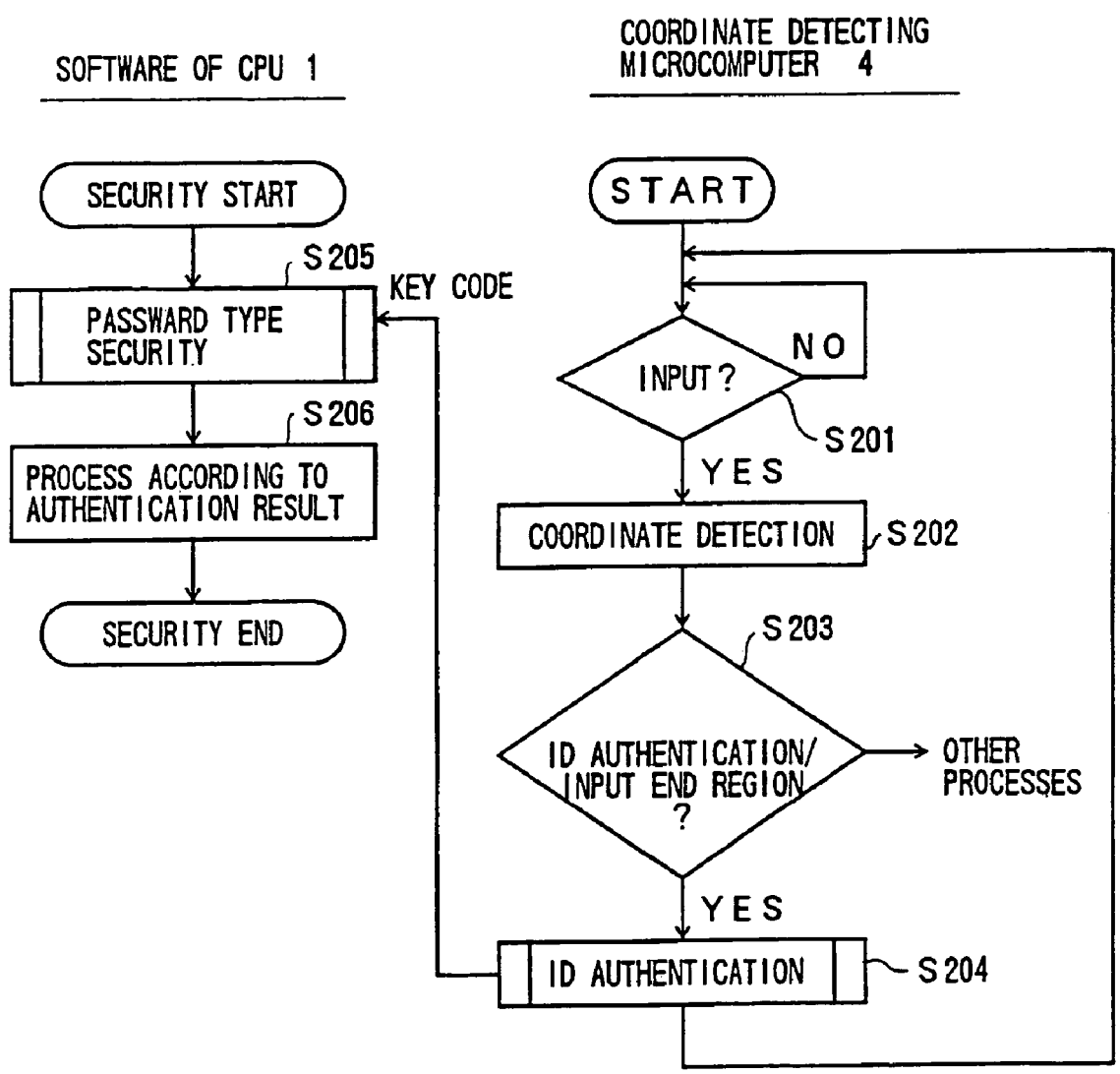
FIG. 25 is a flow chart showing a local ID authentication process carried out by the coordinate detecting microcomputer in the present invention.

FIG. 25 is a flow chart showing a local ID authentication process carried out be the coordinate detecting microcomputer in the present invention.

In FIG. 25, a step S201 decide whether or not an input exists by the coordinate detecting microcomputer 4. If the decision results in the step S201 is YES, the process advances to a step S202. On the other hand, a wait state is assumed if the decision result in the step S201 is NO.

Figure 26:
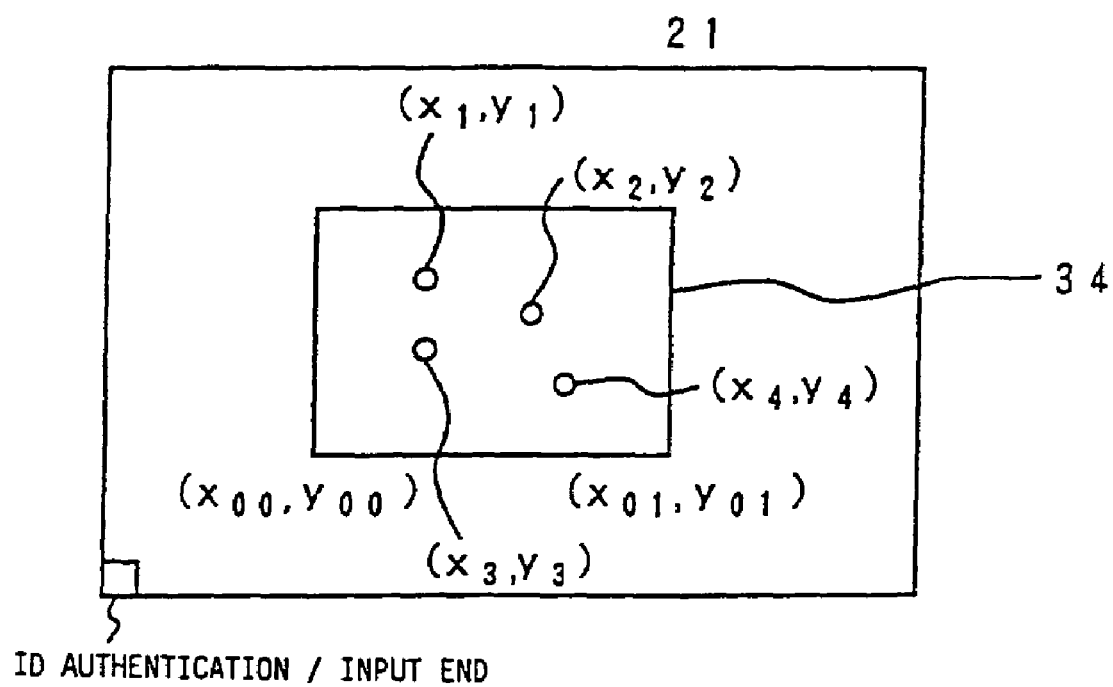
FIG. 26 is a diagram for explaining the definition of the ID authentication start/ID input end in the present invention.

The step S202 detects the input coordinates. As shown in FIG. 26 which will be described later, the card 34 is placed on the tablet 21, and the input coordinates are detected by detecting the position of the holes or openings, cutouts or marks of the card 34 pushed by the pen.

A step S203 decides whether or not the input coordinate corresponds to the ID authentication/input end region. In other words, the step S203 decides whether or not the input coordinate detected in the step S202 corresponds to the region where the ID authentication is started or the region where the input ends. If the decision result in the step S203 is YES, the process advances to a step S204. If the decision result in the step S203 is NO, other processes are carried out.

The step S204 carries out an ID authentication process. As described above in conjunction with FIGS. 23 and 24, the software ten-key is set in a virtual manner within the computer system based on the card origin (x00, y00) and the other specific point (x01, y01) in accordance with the input coordinates detected in the step S202. Then, when the positions of the holes or openings, cutouts or marks of the card 34 are successively pushed third through sixth at the coordinates (x1, y1), (y2, x2), (z3, y3) and (x4, y4) of the point Nos. 1 through 4, the result is converted into the numerical values and output as the key code.

Therefore, the operation of setting the software ten-key in the virtual manner by specifying the origin and the specific point by pushing the positions of the holes or openings, cutouts or marks of the card 34 at the bottom left and the bottom right of the card 34 after placing the card 34 on the tablet 21 shown in FIG. 26, and successively pushing the positions of the holes or openings, cutouts or marks of the card 34 at the point Nos. 1 through 4 by the pen and converting the input coordinates into the numerical values which are further converted into the key code, can be carried out locally in the coordinate detecting microcomputer 4.

A step S205 carries out a so-called password type security by discriminating whether or not the key converted from the coordinate of the ten-key in the step S204 matches the registered data with respect to the column of the numerical values (0, 1, 2, . . . , 9) of the keys of the ten-key.

A step S206 carries out a process corresponding to a result of the authentication.

Therefore, the origin (x00, y00) and the other specific point (x01, y01) are input on the coordinate input apparatus such as the tablet and the touch panel so as to set the software ten-key in a virtual manner, and both the frame of the ten-key and the ten-key itself are not displayed. The card 34 is placed on the coordinate input apparatus, and the coordinates are input by pushing the positions of the holes or openings, cutouts or marks of the card 34 by the pen. The read input coordinate values are converted into the keys of the software ten-key which are pushed, by a local process carried out by the coordinate detecting microcomputer 4. Thereafter, the software of the CPU 1 compares the values of the pushed keys and the registered data, and it is judged that the authentication is acceptable if the compared data match and that the authentication is not acceptable if the compared data do not match. As a result, it is possible to make the authentication by inputting a string of arbitrary numbers or the like from the tablet, touch panel or the like which cannot display the card frame or the like.

FIG. 26 is a diagram for explaining the definition of the ID authentication start/ID input end in the present invention. A region of the ID authentication/input end is provided at a bottom left corner of the tablet 21, for use in instructing the start of the ID authentication or the end of the ID input in the step S203 shown in FIG. 25 described above. A more detailed description will be given later in conjunction with FIG. 27. In this particular case, the specific region at the bottom left corner of the tablet 21, the touch panel or the like is pushed by the pen, so as to start the ID authentication process of the coordinate detecting microcomputer 4 in the step S204. Next, the positions of the holes or openings, cutouts or marks at the bottom left corner and the bottom right corner of the card 34 which is placed on the tablet 21, the touch panel or the like are successively pushed by the pen, so as to input the card origin (x00, y00) and the other specific point (x01, y01). The position of the card 34 is determined from the coordinate values and inclination of the card origin (x00, y00) and the other specific point (x01, y01). Thereafter, the coordinates (x1, y1), (x2, y2), (x3, y3) and (x4, y4) are input by successively pushing the positions of the holes or openings, cutouts or marks at the 4 points on the card 34 by the pen. Further, the specific region at the bottom left corner of the tablet 21, the touch panel or the like is pushed again by the pen, so as to notify the end of the ID input to the coordinate detecting microcomputer 4.

Figure 27:
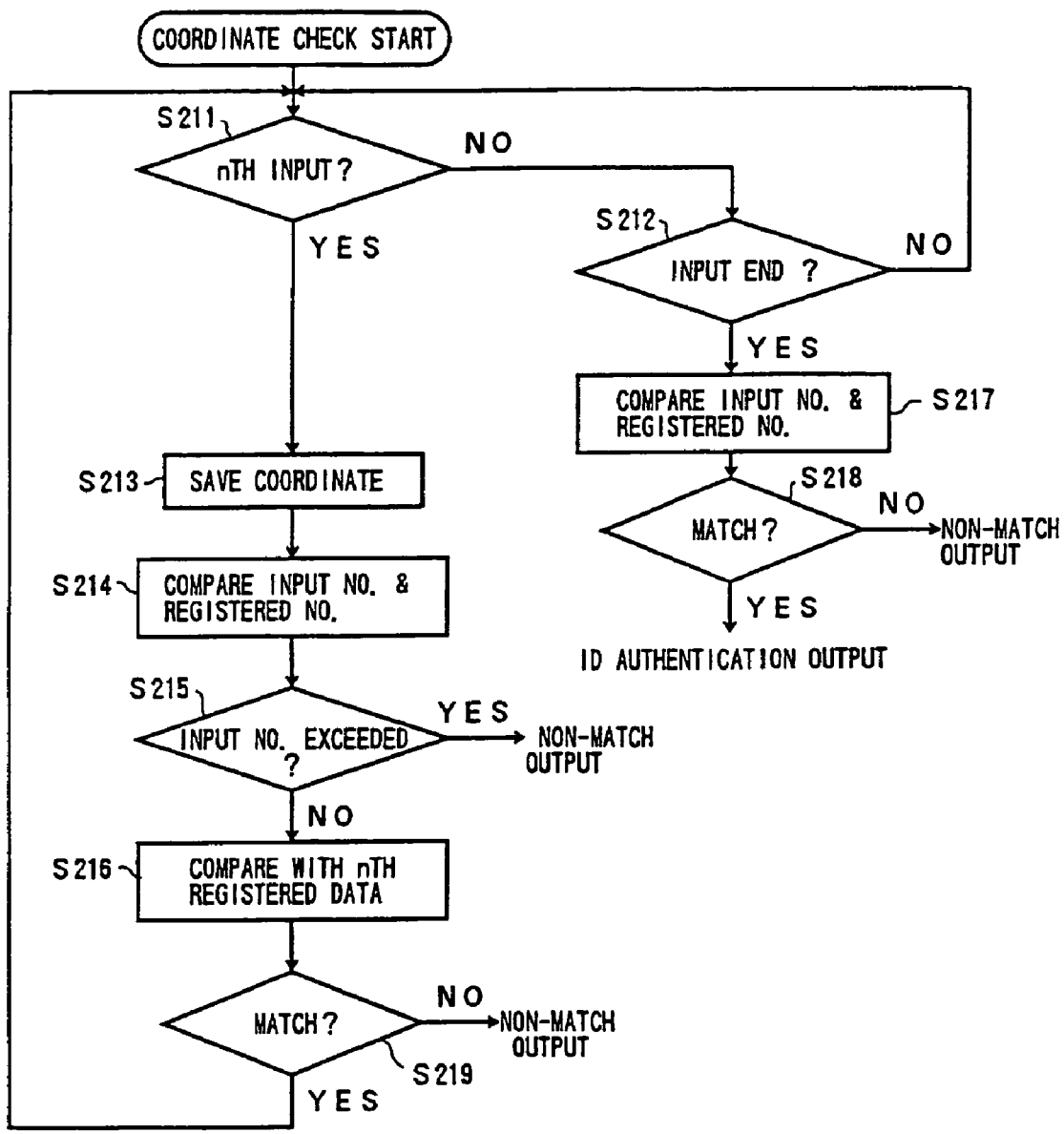
FIG. 27 is a flow chart for explaining an end detecting process responsive to a coordinate input from a specific region on the tablet in the present invention.

FIG. 27 is a flow chart for explaining an end detecting process responsive to a coordinate input from a specific region on the tablet, the touch panel or the like, depending on the input order, in the present invention.

In FIG. 27, a step S211 decides whether or not the input is an nth input. In the case shown in FIG. 26, a decision is made to determine whether or not the input is the fourth input and that the coordinates of the 4 points have been input. If the decision result in the step S211 is YES, the process advances to a step S213. On the other hand, the process advances to a step S212 if the decision result in the step S211 is NO.

The step S212 decides whether or not the input has ended, by discriminating whether or not the coordinate within an end region at the bottom left corner of the tablet 21, the touch panel or the like is input. The process returns to the step S211 if the decision result in the step S212 is NO. If the decision result in the step S212 is YES, a step S217 compares the number of inputs and the number of registered data or the number of registrations. A step 3 decides whether or not the number of inputs and the number of registered data match, and an ID authentication output is made if the compared numbers match while a non-match output is made if the compared numbers do not match.

The step S213 saves the input coordinate.

A step S214 compares the number of inputs and the number of registered data or the number of registrations.

A step S215 decides whether or not the number of inputs exceeds the number of registered data. If the decision result in the step S215 is YES, a non-match output is made. On the other hand, the process advances to a step S216 if the decision result in the step S215 is NO.

The step S216 compares the nth input and the registered data.

A step S219 decides whether or not the data compared in the step S216 match. If the decision result in the step S219 is YES, the process returns to the step S211 so as to wait for the next input. If the decision result in the step S219 is NO, a non-match output is made.

Therefore, the end of the coordinate input is detected if the decision result in the step S212 is YES by detecting the coordinate input from the specific region of the tablet 21, the touch panel or the like, and not based on the time out. In addition, the input coordinates are successively compared with the registered data in the input order, and the ID authentication output is made when the compared data match while the non-match output is made when the compared data do not match.

FIG. 28 is a diagram for explaining the process of increasing the number of IDs to be authenticated in the present invention. The registered data in this case include the following contents.

In FIG. 28, the point Nos. indicate the numbers sequentially assigned to the coordinates which are input by pushing the positions of the holes or openings, cutouts or marks of the card 34 in FIG. 24A or FIG. 26. In this particular case, it is assumed for the sake of convenience that there are 4 point Nos. 1 through 4.

The detected coordinates are the coordinates $(x1, y1)$, $(x2, y2)$, $(x3, y3)$ and $(x4, y4)$ which are detected at the point Nos. 1 through 4.

The card position detection coordinates are obtained as shown based on the coordinate values of the card origin $(x00, y00)$ at the bottom left corner of the card 34 and the other specific point $(x01, y01)$, and the inclinations $\sin \Delta\theta$ and $\cos \Delta\theta$ and the distance $1_0$ between the positioning holes or the like are obtained. The software ten-key comparison coordinates are obtained by converting the coordinates $(x1, y1)$, $(x2, y2)$, $(x3, y3)$ and $(x4, y4)$ at the 4 point Nos. 1 through 4 into coordinate values $(x1', y1')$, $(x2', y2')$, $(x3', y3')$ and $(x4', y4')$ on the software ten-key based on the card position detection coordinates using the formulas shown in FIG. 28.

The registered coordinates correspond to the coordinates which are detected.

In this case, the software ten-key is not used. In the case where the software ten-key is used and 4 rows×10 columns of keys are provided, 1 arbitrary key (number) is selected from each row. Accordingly, there are $10^4=10000$ combinations of keys (numbers). On the other hand, in the case where no software ten-key is used, the restriction to select 1 hole or the like from each row is removed, and the first input is made by selecting an arbitrary 1 of 40 holes or the like, the second input is made by selecting an arbitrary 1 of the remaining 39 holes or the like, and so on, so that there are 40×39×38× 37=2193360 combinations. The point which is once selected is excluded from the subsequent selection because there is a possibility of the same coordinate being input a plurality of times due to a bouncing of the pen when the pen pushes the position of the hole or the like. When the coordinate detecting microcomputer 4 judges that the input coordinates match the registered data, the coordinate detecting microcomputer 4 outputs a corresponding key code which is registered separately.

On the other hand, when 4 rows×10 columns of keys of the software ten-key are set in a virtual manner on the tablet 21, the touch panel or the like in correspondence with the card origin $(x00, y00)$ at the bottom left corner of the card and the other specific point $(x01, y01)$ at the bottom right corner of the card, arbitrary 4 holes or openings, cutouts or marks are selected from all of the 4 rows×10 columns of corresponding keys. Hence, if the ID is input in 4 digits of a decimal number, there are a total of 40×39×38×37=2193360 combinations for the ID, which is 219 times the number of combinations for the ID if the ID is successively input by use of the conventional ten-key. In this case, if a total of 2 holes or openings, cutouts or marks of the card are used as the card origin and the other specific point, the ID can be input using the remaining 38 holes or openings, cutouts or marks of the card, and there are a total of 38×37×36×35=1771560 combinations for the ID, which is 177 times the number of combinations for the ID if the ID is successively input by use of the conventional ten-key.

Therefore, the software ten-key can be set in a virtual manner on the tablet 21, the touch panel or the like and not displayed, by placing the card on the tablet 21, the touch panel or the like and specifying arbitrary 2 points on the card, such as the card origin $(x00, y00)$ at the bottom left corner of the card and the other specific point at the bottom right corner of the card. By inputting the coordinates from the software ten-key and converting the input coordinates into the numerical values based on the input coordinate values, it is possible to considerably increase the number of combinations of the ID compared to the conventional case which inputs the coordinates by pushing the ten-key. For example, the reliability can be improved to several hundred time or more as compared to the conventional case, and it is possible to improve the reliability of the security and to prevent the ID from being easily stolen by a third party.

FIG. 29 shows a first application of the present invention. In this first application, the present invention is applied to the pen PC (pen input type personal computer). A card such as the card (or ID card) 34 is placed on the screen 32 of the pen PC, and the holes or openings, cutouts or marks of the card are pushed by the pen 33. The input coordinates are detected by the transparent coordinate detector arranged on the screen 32 or, in the case of the electromagnetic induction type, by the non-transparent coordinate detector arranged below the screen 32. The authentication is made by comparing the input coordinates and the registered ID as described above. The card frame may be displayed on the screen 32, so that the card 34 is placed within the displayed card frame and the coordinates are input by pushing the positions of the holes or openings, cutouts or marks of the card 34 by the pen 33. Alternatively, instead of displaying the card frame, it is possible to set the card frame or the frame of the software ten-key in a virtual manner based on the pushing of the positions of predetermined one or plurality of holes or openings, cutouts or marks of the card 34 by the pen 33. In any case, the input coordinates are detected based on the positions of the holes or openings, cutouts or marks of the card 34 pushed by the pen 33 with reference to the displayed frame or the frame which is set in a virtual manner within the computer system, and the authentication is made by comparing the input coordinates and the registered coordinates or registered data.

FIG. 30 shows a second application of the present invention. The pen input type computer 41 shown in FIG. 30 which is portable has already been developed. The pen input type computer 41 is mounted with the display part 42 made of a thin liquid crystal display panel having B5 or A4 size, for example. A transparent touch panel which is not shown is provided to cover the front face of this display part 42. When the input pen 43 is moved to a close proximity of, touches or, lightly pushes on this touch panel, it is possible to detect the coordinate indicated by the pen 43. The display part 42 is of course not limited to the liquid crystal display, and the present invention is similarly applicable to cases where the display part 42 is made of a plasma discharge panel or a CRT. The pen input type computer 41 may have an internal structure shown in FIG. 1, for example. In addition, the present invention is not only applicable to the pen input type computer 41, but is similarly applicable to a word processor, an electronic notebook or diary, a desk top apparatus coupled to a coordinate detecting apparatus, and various kinds of programmable apparatuses having a coordinate detecting apparatus such as cash dispensers. Furthermore, the types of computer input roughly include the resistor layer type, the electrostatic coupling type and the electromagnetic induction type, but the present invention may employ any of such types of computer input. In the case of the electromagnetic induction type, the coordinate detector which is arranged below the screen such as the liquid crystal display detects the coordinate by sensing the magnetism of the pen or stylus. Moreover, the input is not limited to a pen input, and the present invention is applicable to a touch panel or the like which receives an input by the user's finger tips.

In another embodiment of the present invention, a program for making a computer carry out the user authentication method of the present invention described above is stored in a computer readable storage medium. In other words, the program for making the coordinate detecting microcomputer 4 shown in FIG. 1 or, the CPU 1 and the coordinate detecting microcomputer 4 or, a single CPU which realizes the functions of the CPU 1 and the coordinate detecting microcomputer 4, carry out the user authentication method of the present invention described above is stored in the storage medium such as the CD-ROM 8a and the floppy disk 9a. The storage medium is of course not limited to the CD-ROM and the floppy disk, and may be any kind of storage medium capable of storing the program, including semiconductor memory devices such as a ROM, an EPROM, an EEPROM and a RAM, various disks such as an optical disk, a magneto-optic disk and a magnetic disk, and a card shaped recording medium.

Next, a description will be given of the user authentication card according to the present invention, by referring to FIGS. 31 through 34.

Figure 31:
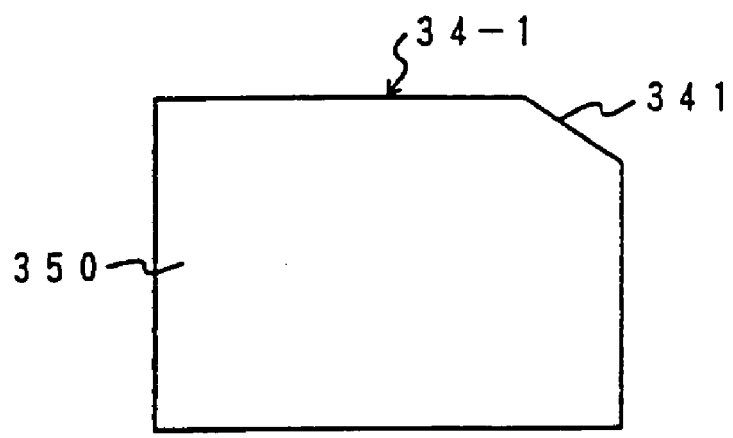
FIG. 31 is a diagram showing a first embodiment of the user authentication card.

FIG. 31 is a diagram showing a first embodiment of the user authentication card. In FIG. 31, a card 34-1 has a cutout 341 at a top right corner, and an ID input region 350 at a central portion. This ID input region 350 is provided with the holes or openings, cutouts or marks for inputting the user ID or, the perforated parts which may be punched out as described above in conjunction with FIGS. 15A and 15B. By making the shape of the card 34-1 asymmetrical with respect to the top and bottom and to the right and left, the user can easily recognize the front and back sides and the top and bottom of the card 34-1. In the case of the card 34-1 shown in FIG. 31, the user is notified in advance that the card 34-1 should be placed on the screen of the coordinate detector in a direction such that the cutout 341 of the card 34-1 is located at the top right corner of the card 34-1. Accordingly, the front and back sides and the top and bottom of the card 34-1 are automatically arranged in the correct position when the user places the card 34-1 on the screen of the coordinate detector so that the cutout 341 is located at the top right corner of the card 34-1. For this reason, it is possible to positively prevent an erroneous input of the user ID which would occur if the front and back sides and the top and bottom of the card 34-1 were arranged in an incorrect position.

In order to input the user. ID or the like, it is sufficient if the coordinate can be specified. Hence, the hole may penetrate the card or, the hole may be a cavity which does not penetrate the card, as long as the coordinate can be specified. In other words, the card may be provided with an opening, a hole in the form of a cavity, a penetrating hole, a cutout, a printed mark, a projection or the like. In the case of the pen PC which will be described later, there are the resistor layer type, electrostatic coupling type, electromagnetic induction type and the like. For example, in the case of the electromagnetic induction type, the coordinate is detected by sensing magnetism of a pen (or stylus) by a coordinate detector which is arranged below the screen, and the magnetism can be sensed even if the pen does not make direct contact with the screen. Hence, in this case, the card does not necessarily have to be provided with a penetrating hole, and the hole may be a cavity or the like which does not penetrate the card. In addition, a mark may be provided on the card in place of the hole.

Figure 32A:
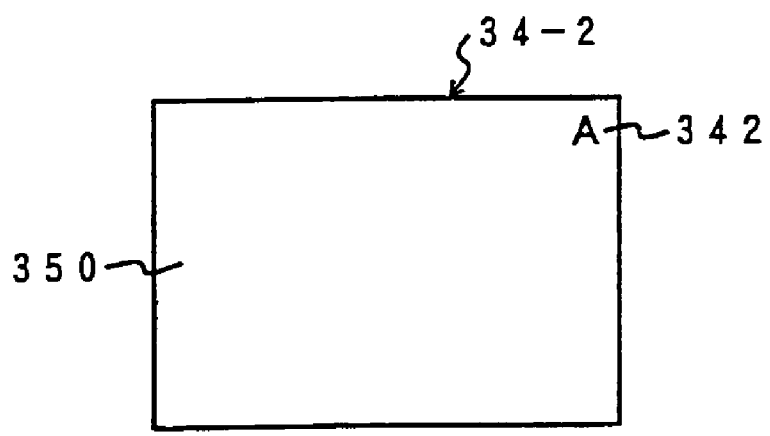
FIGS. 32A an 32B respectively are diagrams showing a second embodiment of the user authentication card.
Figure 32B:
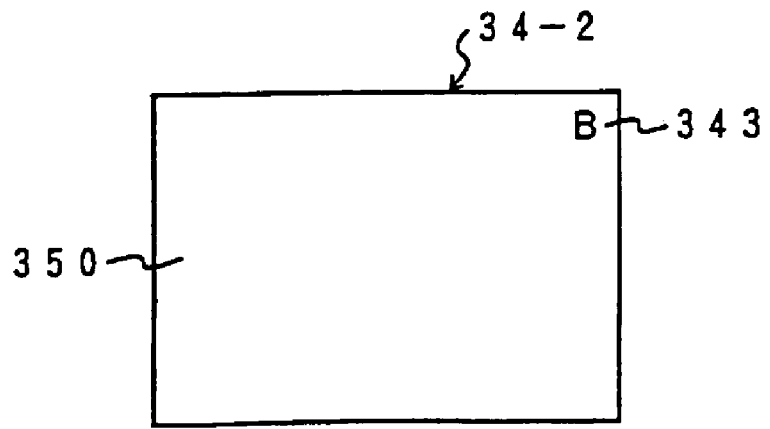

FIGS. 32A and 32B respectively are diagrams showing a second embodiment of the user authentication card. As shown in FIG. 32A, a mark 342 made up of an indication "A" to indicate the front side is printed on the front side of a card 34-2. In addition, a mark 343 made up of an indication "B" to indicate the back side is printed on the back side of the card 34-2 as shown in FIG. 32B. For example, it is possible to omit the mark 343 indicating the back side, and to provide a mark on only one of the front and back sides of the card 34-2. In addition, the marks 342 and 343 may be formed on the card 34-2 as a variation in geometrical configuration such as a cavity or a projection. The ID input region 350 at a central portion of the card 34-2. This ID input region 350 is provided with the holes or openings, cutouts or marks for inputting the user ID or, the perforated parts which may be punched out and removed as described above in conjunction with FIGS. 15A and 15B. When placing the card 34-2 on the screen, the user arranges the card 34-2 in a direction such that the mark 342 can be read correctly as "A". Accordingly, the front and back sides and the top and bottom of the card 34-2 are automatically arranged in the correct position when the user places the card 34-2 on the screen of the coordinate detector so that the mark 342 can be read correctly as "A", and for this reason, it is possible to positively prevent an erroneous input of the user ID which would occur if the front and back sides and the top and bottom of the card 34-2 were arranged in an incorrect position.

In the case where the screen is constructed so that the coordinate input is only possible when a pen or the like makes direct contact with the screen, the ID input region 350 of the cards 34-1 and 34-2 shown in FIGS. 31 and 32 includes a plurality of discontinuous holes, openings, cutouts or, perforated parts which may be punched out and removed as described above in conjunction with FIGS. 15A and 15B. In this case, the cards 34-1 and 34-2 may be made of a transparent material or a non-transparent material. On the other hand, in the case where-the screen is constructed so that the coordinate input is possible even when a pen or the like does not make direct contact with the screen, the ID input region 350 of the cards 34-1 and 34-2 includes a plurality of discontinuous holes, openings, cutouts, marks or, perforated parts which may be punched out and removed as described above in conjunction with FIGS. 15A and 15B. In this case, the cards 34-1 and 34-2 may be made of a transparent material or a non-transparent material.

Figure 33:
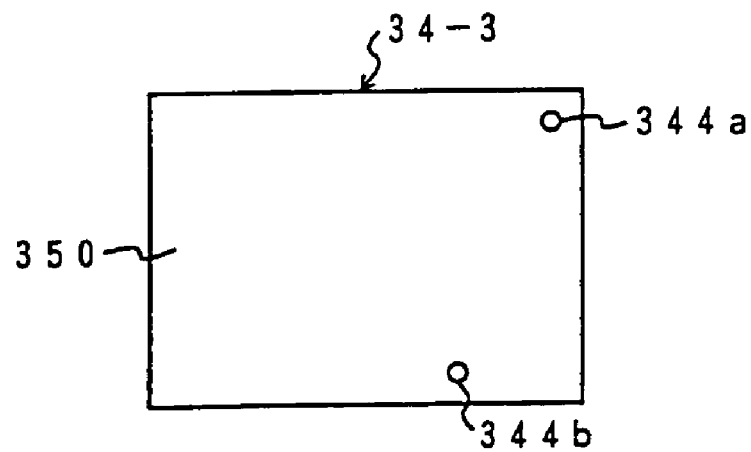
FIG. 33 is a diagram showing a third embodiment of the user authentication card.

FIG. 33 is a diagram showing a third embodiment of the user authentication card. In FIG. 33, holes 344*a* and 344*b* are formed at positions asymmetrical to the top and bottom and to the right and left of a card 34-3. The ID input region 350 is provided at a central portion of the card 34-3. This ID input region 350 is provided with the holes or openings, cutouts or marks for inputting the user ID or, the perforated parts which may be punched out as described above in conjunction with FIGS. 15A and 15B. As described above in conjunction with FIGS. 5A and 5B, the holes 344*a* and 344*b* are used when inputting data with respect to the position of the card 34-3 to the coordinate detecting microcomputer 4. In addition, the hole 344*a* formed at the top right corner of the card 34-3 also functions as a direction specifying means for enabling the user to correctly recognize the front and back sides and the top and bottom of the card 34-3, similarly to the card shown in FIG. 31 or FIGS. 32A and 32B. By making the positions of the holes 344*a* and 344*b* asymmetrical to the top and bottom and to the right and left of the card 34-3, the user can easily and correctly recognize the front and back sides and the top and bottom of the card 34-3. In the case of the card 34-3 shown in FIG. 33, the user is notified in advance that the card 34-3 should be placed on the screen of the coordinate detector in a direction such that the hole 344*a* of the card 34-3 is located at the top right corner of the card 34-3. Accordingly, the front and back sides and the top and bottom of the card 34-3 are automatically arranged in the correct position when the user places the card 34-3 on the screen of the coordinate detector so that the hole 344*a* is located at the top right corner of the card 34-3. For this reason, it is possible to positively prevent an erroneous input of the user ID which would occur if the front and back sides and the top and bottom of the card 34-3 were arranged in an incorrect position.

Figure 34:
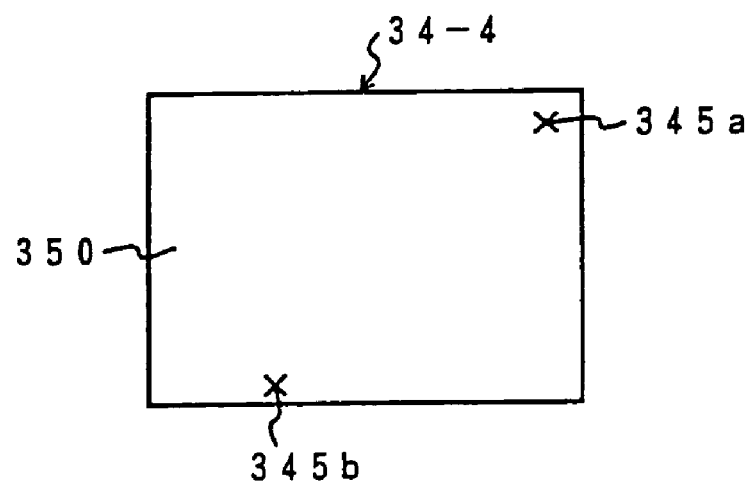
FIG. 34 is a diagram showing a fourth embodiment of the user authentication card.

FIG. 34 is a diagram showing a fourth embodiment of the user authentication card. In FIG. 34, marks 345*a* and 345*b* are formed at positions asymmetrical to the top and bottom and to the right and left of a card 34-4. The ID input region 350 is provided at a central portion of the card 34-4. This ID input region 350 is provided with the holes or openings, cutouts or marks for inputting the user ID or, the perforated parts which may be punched out as described above in conjunction with FIGS. 15A and 15B. As described above in conjunction with FIGS. 5A and 5B, the marks 345*a* and 345*b* are used when inputting data with respect to the position of the card 34-4 to the coordinate detecting microcomputer 4. In addition, the mark 345*a* formed at the top right corner of the card 34-4 also functions as a direction specifying means for enabling the user to correctly recognize the front and back sides and the top and bottom of the card 34-4, similarly to the card shown in FIG. 31 or FIGS. 32A and 32B. By making the positions of the marks 345*a* and 345*b* asymmetrical to the top and bottom and to the right and left of the card 34-4, the user can easily and correctly recognize the front and back sides and the top and bottom of the card 34-4. In the case of the card 34-4 shown in FIG. 34, the user is notified in advance that the card 34-4 should be placed on the screen of the coordinate detector in a direction such that the mark 345*a* of the card 34-4 is located at the top right corner of the card 34-4. Accordingly, the front and back sides and the top and bottom of the card 34-4 are automatically arranged in the correct position when the user places the card 34-4 on the screen of the coordinate detector so that the mark 345*a* is located at the top right corner of the card 34-4. For this reason, it is possible to positively prevent an erroneous input of the user ID which would occur if the front and back sides and the top and bottom of the card 34-4 were arranged in an incorrect position.

In the case where the screen is constructed so that the coordinate input is only possible when a pen or the like makes direct contact with the screen, the ID input region 350 of the cards 34-3 and 34-4 shown in FIGS. 33 and 34 includes a plurality of discontinuous holes, openings, cutouts or, perforated parts which may be punched out and removed as described above in conjunction with FIGS. 15A and 15B. In this case, the cards 34-3 and 34-4 may be made of a transparent material or a non-transparent material. On the other hand, in the case where the screen is constructed so that the coordinate input is possible even when a pen or the like does not make direct contact with the screen, the ID input region 350 of the cards 34-3 and 34-4 includes a plurality of discontinuous holes, openings, cutouts, marks or, perforated parts which may be punched out and removed as described above in conjunction with FIGS. 15A and 15B. In this case, the cards 34-3 and 34-4 may be made of a transparent material or a non-transparent material.

In a case where the position marker displayed on the screen is displayed at a position which falls within the external contour of the card, it is desirable that the card is made of a transparent material. In this case, the displayed position marker becomes visible through the card, and it is easy to match the positions of the holes or openings, cutouts or marks of the card to the corresponding position markers while moving the card on the screen with respect to the displayed position markers.

Of course, it is possible to arbitrarily combine the various embodiments of the card described above, so that the holes or openings, cutouts, marks and/or perforated parts which may be punched out and removed coexist on the card.

Therefore, since the present invention makes the authentication by collating the coordinate pattern which is input via the holes, cutouts or the like of the card and the registered coordinate pattern, it is possible to improve the reliability of the security by use of a key unique to the user. In addition, the security with the high reliability can be achieved simply by a portable card set with the key.

Further, the present invention is not limited to these embodiments, but various variations and modifications may be made without departing from the scope of the present invention.

What is claimed is:

1. An authentication apparatus comprising:
   a touch sensor capable of detecting one or more coordinates;
   a specifying member adjacent to said touch sensor, the specifying member capable of providing input to said touch sensor, the specifying member further capable of specifying one or more discontinuous different coordinates, wherein said specifying member comprises perforations or projections capable of specifying the one or more discontinuous different coordinates;
   a comparing unit capable of comparing the one or more detected coordinates and one or more registered coordinates, and further capable of outputting a compared result; and
   an authentication unit capable of carrying out an authentication based at least in part upon the compared result.

2. The authentication apparatus according to claim 1, wherein said specifying member is capable of specifying the one or more discontinuous different coordinates by one or more discontinuous holes or openings, and/or cutouts or marks, and/or combinations thereof.

3. The authentication apparatus according to claim 1, further comprising:
   a judging unit capable of judging an end of the input of the one or more detected coordinates when an input interval of the one or more detected coordinates is longer than a predetermined interval or the input interval of the one or more detected coordinates is longer than an average value of the input interval.

4. The authentication apparatus according to claim 1, wherein the specifying member is capable of being placed approximately adjacent to a specified region of the touch sensor.

5. The authentication apparatus according to claim 2, wherein the holes or openings, and/or cutouts or marks, and/or combinations thereof, of said specifying member are, capable of being provided at arbitrary positions.

6. The authentication apparatus according to claim 1, wherein the specifying member is capable of being placed in a specified region which is capable of being arbitrarily movable on said touch sensor.

7. The authentication apparatus according to claim 1, further comprising:
   a registering unit capable of registering user levels, and a manager level which is capable of being common to all of the user levels, with respect to the one or more registered coordinates, registered coordinate patterns or registered code values.

8. The authentication apparatus according to claim 1, wherein said comparing unit comprises a unit part capable of obtaining the one or more registered coordinates from positions and registered patterns, specified at least in part by one or more arbitrary ones of the detected coordinates.

9. The authentication apparatus according to claim 1, wherein said touch sensor is capable of virtually setting a keyboard at a position indicated at least in part by one or more arbitrary inputs via the specifying member which is capable of being placed adjacent to said touch sensor and capable of specifying the one or more discontinuous different coordinates, and capable of detecting a code corresponding at least in part to each key located at a position where the one or more arbitrary inputs are made based at least in part upon the virtually set keyboard, and said comparing unit capable of comparing each detected code with registered codes.

10. The authentication apparatus according to claim 1, wherein said touch sensor is capable of detecting resistances corresponding at least in part to the coordinates input from a resistor layer type touch sensor via the specifying member, and wherein said comparing unit is capable of comparing the one or more detected coordinates and the registered coordinates at least in part by comparing the detected resistances and registered resistances.

11. The authentication apparatus according to claim 1, wherein said touch sensor is provided in a display.

12. A user authentication method, comprising:
   detecting one or more coordinates via a specifying member, which is capable of being placed adjacent to a touch sensor, using perforations or projections on the specifying member to specify one or more discontinuous different coordinates;
   comparing the one or more detected coordinates and one or more registered coordinates and outputting a compared result; and
   carrying out an authentication based at least in part upon the compared result.

13. The user authentication method according to claim 12, wherein said member is capable of specifying the one or more discontinuous different coordinates by one or more discontinuous holes or openings, and/or cutouts or marks, and/or combinations thereof.

14. The user authentication method according to claim 12, wherein said carrying out of said authentication comprises comparing an order of the one or more detected coordinates and an order of the one or more registered coordinates, and further comprises carrying out the authentication based at least in part upon a compared result of the orders.

15. The user authentication method according to claim 12, further comprising:
   judging an end of the input of the one or more detected coordinates based at least in part upon an input interval of the one or more detected coordinates being longer than a predetermined interval or, the input interval of the one or more detected coordinates being longer than an average value of the input interval.

16. The user authentication method according to claim 12, wherein said specifying member is capable of being placed adjacent to a specified region of said touch sensor.

17. The user authentication method according to claim 13, wherein the holes or openings, cutouts and/or marks of the specifying member are capable of being provided at arbitrary positions.

18. The user authentication method according to claim 12, wherein the specifying member is capable of being placed in a specified region which is capable of being arbitrarily movable on the touch sensor.

19. The user authentication method according to claim 12, further comprising:
   registering user levels and a manager level, which is capable of being common to all of the user levels, with respect to the one or more registered coordinates, registered coordinate patterns and/or registered code values.

20. The user authentication method according to claim 12, wherein said comparing comprises obtaining the one or more registered coordinates from positions and registered patterns specified at least in part by one or more arbitrary ones of the detected coordinates.

21. The user authentication method according to claim 12, wherein said detecting comprises virtually setting a keyboard at a position indicated at least in part by one or more of arbitrary inputs via the specifying member which is capable of being placed adjacent the touch sensor and capable of specifying the one or more discontinuous different coordinates, and capable of detecting a code corresponding at least in part to each key located at a position where the one or more arbitrary inputs are made based at least in part upon the virtually set keyboard, and wherein said comparing is capable of comparing each detected code with registered codes.

22. The user authentication method according to claim 12, wherein said detecting comprises detecting resistances corresponding at least in part to the coordinates input from a resistor layer type touch sensor via the specifying member, and wherein said comparing comprises comparing the one or more detected coordinates and the registered coordinates by comparing the detected resistances and registered resistances.

23. The user authentication method according to claim 12, wherein the touch sensor is capable of being provided in a display unit.

24. A user authentication system, comprising:
means for detecting one or more coordinates from a card having one or more discontinuous marks;
means for comparing the one or more detected coordinates and one or more registered coordinates and outputting a compared result; and
means for carrying out an authentication based at least in part upon the compared result.

25. The user authentication system according to claim 24, further comprising:
means for judging an end of the input of the one or more detected coordinates based at least in part upon an input interval of the one or more detected coordinates being longer than a predetermined interval or, the input interval of the one or more detected coordinates being longer than an average value of the input interval.

26. The user authentication system according to claim 24, further comprising:
means for registering user levels, and a manager level which is capable of being common to all of the user levels, with respect to the one or more registered coordinates, registered coordinate patterns and/or registered code values.

27. A computer readable medium having instructions stored thereon that, if executed by a computing platform, result in user authentication by:
detecting one or more coordinates via a specifying member which is capable of being placed adjacent to a touch sensor, using perforations or projections on the specifying member to specify one or more discontinuous different coordinates;
comparing the one or more detected coordinates and one or more registered coordinates and outputting a compared result; and
carrying out an authentication based at least in part upon the compared result.

28. The computer readable medium according to claim 27, wherein said member is capable of specifying the one or more discontinuous different coordinates by one or more discontinuous holes or openings, and/or cutouts or marks, and/or combinations thereof.

29. The computer readable medium according to claim 27, wherein said carrying out of said authentication comprises comparing an order of the one or more detected coordinates and an order of the one or more registered coordinates, and further comprises carrying out the authentication based at least in part upon a compared result of the orders.

30. The computer readable medium according to claim 27, further comprising instructions for:
judging an end of the input of the one or more detected coordinates based at least in part upon an input interval of the one or more detected coordinates being longer than a predetermined interval or, the input interval of the one or more detected coordinates being longer than an average value of the input interval.

31. The computer readable medium according to claim 27, wherein said specifying member is capable of being placed adjacent to a specified region of said touch sensor.

32. The computer readable medium according to claim 28, wherein the holes or openings, cutouts and/or marks of the specifying member are capable of being provided at arbitrary positions.

33. The computer readable medium according to claim 27, wherein the specifying member is capable of being placed in a specified region which is capable of being arbitrarily movable on the touch sensor.

34. The computer readable medium according to claim 27, further comprising instructions for:
registering user levels and a manager level which is capable of being common to all of the user levels, with respect to the one or more registered coordinates, registered coordinate patterns and/or registered code values.

35. The computer readable medium according to claim 27, wherein said comparing comprises obtaining the one or more registered coordinates from positions and registered patterns specified at least in part by one or more arbitrary ones of the detected coordinates.

36. The computer readable medium according to claim 27, wherein said detecting comprises virtually setting a keyboard at a position indicated at least in part by one or more of arbitrary inputs via the specifying member which is capable of being placed adjacent the touch sensor and capable of specifying the one or more discontinuous different coordinates, and capable of detecting a code corresponding at least in part to each key located at a position where the one or more arbitrary inputs are made based at least in part upon the virtually set keyboard, and wherein said comparing is capable of comparing each detected code with registered codes.

37. The computer readable medium according to claim 27, wherein said detecting comprises detecting resistances corresponding at least in part to the coordinates input from a resistor layer type touch sensor via the specifying member, and wherein said comparing comprises comparing the one or more detected coordinates and the registered coordinates by comparing the detected resistances and registered resistances.

38. The computer readable medium according to claim 27, wherein the touch sensor is capable of being provided in a display unit.

* * * * *

UNITED STATES PATENT AND TRADEMARK OFFICE
CERTIFICATE OF CORRECTION

PATENT NO. : 7,590,858 B2  Page 1 of 1
APPLICATION NO. : 11/362315
DATED : September 15, 2009
INVENTOR(S) : Kubo et al.

It is certified that error appears in the above-identified patent and that said Letters Patent is hereby corrected as shown below:

On the Title Page

Item [*] Notice:    Subject to any disclaimer, the term of this patent is extended or adjusted under 35 U.S.C. 154(b) by 535 days.

Delete the phrase "by 535 days" and insert -- by 738 days --

Signed and Sealed this

First Day of June, 2010

David J. Kappos
*Director of the United States Patent and Trademark Office*